(12) United States Patent
Hashizume et al.

(10) Patent No.: US 8,346,030 B2
(45) Date of Patent: Jan. 1, 2013

(54) POLARIZATION-INDEPENDENT WAVEGUIDE-TYPE OPTICAL INTERFERENCE CIRCUIT

(75) Inventors: Yasuaki Hashizume, Atsugi (JP); Manabu Oguma, Atsugi (JP); Takashi Saida, Atsugi (JP); Masaki Kotoku, Atsugi (JP); Takayuki Mizuno, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 321 days.

(21) Appl. No.: 12/673,473

(22) PCT Filed: Aug. 24, 2007

(86) PCT No.: PCT/JP2007/066486
§ 371 (c)(1),
(2), (4) Date: Feb. 12, 2010

(87) PCT Pub. No.: WO2009/028029
PCT Pub. Date: Mar. 5, 2009

(65) Prior Publication Data
US 2011/0103736 A1       May 5, 2011

(51) Int. Cl.
*G02B 6/00*      (2006.01)
(52) U.S. Cl. ........................................... 385/11
(58) Field of Classification Search .................. 385/11
See application file for complete search history.

(56) References Cited

U.S. PATENT DOCUMENTS

| 5,694,496 | A | 12/1997 | Ando et al. |
| 6,823,094 | B2 | 11/2004 | Goh et al. |
| 7,376,310 | B2 * | 5/2008 | Wiesmann et al. ............. 385/40 |
| 2002/0126933 | A1 | 9/2002 | Goh et al. |
| 2002/0181870 | A1 | 12/2002 | Inoue et al. |

FOREIGN PATENT DOCUMENTS

| EP | 1315007 | 5/2003 |
| EP | 2103973 | 9/2009 |
| JP | 63-147145 | 6/1988 |
| JP | 04113302 A * | 4/1992 |
| JP | 04-241304 | 8/1992 |
| JP | 06-051145 | 2/1994 |
| JP | 6-60982 | 8/1994 |

(Continued)

OTHER PUBLICATIONS

Supplementary European Search Report issued in counterpart European Patent Application No. 07806072.0 on Jul. 16, 2010.

(Continued)

*Primary Examiner* — Sarah Hahm
(74) *Attorney, Agent, or Firm* — Workman Nydegger

(57) ABSTRACT

A Mach-Zehnder interferometer circuit (700) is provided with two couplers (722, 724) and two arm waveguides (706, 708) connecting the couplers with each other, each fabricated on a substrate, in which a polarization rotation device (732) is disposed in a groove dividing each of the two arm waveguides into two, the polarization rotation device (732) for converting vertically polarized light into horizontally polarized light, and birefringence is adjusted by performing laser irradiation or the like partially into at least one of the two arm waveguides such that a difference between birefringence values divided by an optical wavelength to be used is within a range of 2 m−0.2 to 2 m+0.2 (m is an integer including zero), the birefringence values being those integrated linearly along the respective two arm waveguides in an optical signal travelling direction.

16 Claims, 13 Drawing Sheets

FOREIGN PATENT DOCUMENTS

| | | |
|---|---|---|
| JP | 7-92326 | 4/1995 |
| JP | 2002-221630 | 8/2002 |
| JP | 3703013 | 10/2005 |
| JP | 2007232944 A * | 9/2007 |
| WO | WO 01/59495 A1 | 8/2001 |

OTHER PUBLICATIONS

International Preliminary Report on Patentability and Written Opinion issued in PCT Application No. PCT/JP2007/066486 on Mar. 18, 2010 (English translation).

Kyo Inoue et al., *A Four-Channel Optical Waveguide Multi/Demultiplexer for 5-GHz spaced Optical FDM Transmission*, Journal of Lightwave Technology, vol. 6, No. 2, Feb. 1988, pp. 339-345.

Yasuyuki Inoue et al., *Elimination of Polarization Sensitivity in Silica-Based Wavelength Division Multiplexer Using a Polyimide Half Waveplate*, Journal of Lightwave Technology, vol. 15, No. 10, Oct. 1997, pp. 1947-1957.

B.L. Heffner, *Deterministic, Analytically Complete Measurement of Polarization-Dependent Transmission Through Optical Devices*, IEEE Photonics Technology Letters, vol. 4, No. 5, May 1992, pp. 451-454.

Masayuki Okuno et al., *Birefringence Control of Silica Waveguides in Si and Its Application to a Polarization-Beam Splitter/Switch*, Journal of Lightwave Technology, vol. 12, No. 4, Apr. 1994, pp. 625-633.

2006-114805, Apr. 28, 2009, Office Action for related Japanese application with English translation.

* cited by examiner

POLARIZATION-INDEPENDENT WAVEGUIDE-TYPE OPTICAL INTERFERENCE CIRCUIT

TECHNICAL FIELD

The present invention relates to a polarization-independent waveguide-type optical interference circuit which suppresses polarization dependence and temperature dependence regarding polarization.

BACKGROUND ART

A further demand of a longer distance and a larger capacitance in optical communication has been making wavelength multiplex communication an important technology. A device indispensable to this wavelength multiplex communication system includes a wavelength multiplexing/demultiplexing filter for multiplexing/demultiplexing wavelength of an optical signal. For example, a simple wavelength multiplexing/demultiplexing filter includes a Mach-Zehnder interferometer circuit (hereinafter, called MZI) using an optical waveguide (refer to, e.g., Non-patent document 1).

FIG. 1 shows a schematic diagram of this MZI. An MZI 100 is provided with two couplers (122 and 124) and arm waveguides (106, 108) connecting the two couplers with each other, and the coupler 122 is provided with two input waveguides (102, 104) and the coupler 124 is provided with two output waveguides (110, 112).

Hereinafter, the operation principle and polarization dependence of the Mach-Zehnder interferometer will be explained.

In the MZI 100, a path from an input I1 (input waveguide 102) to an output O1 (output waveguide 110) is defined as a through-path and a path from an input I1 (input waveguide 102) to an output O2 (output waveguide 112) is defined as a cross path. In this case, optical outputs ($O^{through}$ and $O^{cross}$) of the respective paths are described as follows by using the publicly known interference principle (here, a coupling ratio of the coupler is assumed to be 50%).

[Formula 1]

$$O^{through} = I_0 \sin^2\left(\frac{n\Delta L}{2} \cdot \frac{2\pi}{\lambda}\right) \quad (1)$$

$$O^{cross} = I_0 \cos^2\left(\frac{n\Delta L}{2} \cdot \frac{2\pi}{\lambda}\right) \quad (2)$$

Here, $I_0$ indicates the optical intensity of input light, n indicates an effective refraction index, $\Delta L$ indicates a path difference between the two arm waveguides, and $\lambda$ indicates a wavelength to be used.

The optical signal is extinguished and output to the other path periodically at signal wavelengths which satisfy $n\Delta L=\lambda m$ in Formula (1) for the through path and the following condition in Formula (2) for the cross path (m is integer), and the through-path and the cross path function as a wavelength multiplexing/demultiplexing filter.

$$n\Delta L = \lambda\left(m + \frac{1}{2}\right) \quad \text{[Formula 2]}$$

(m: integer)

The following is a fabrication method of the optical waveguide used for such a device.

A lower under-clad layer mainly made of $SiO_2$ and a core layer made of $SiO_2$ doped with $GeO_2$ are deposited sequentially on a silicon substrate by the use of a flame deposition method. Subsequently, the core layer is patterned by the use of reactive ion etching. Then, by another use of the flame deposition method, an over-clad layer is deposited to fabricate an embedded optical waveguide.

Usually, such an optical waveguide has birefringence because of stress caused by a core shape or a difference between the thermal expansion coefficients of the substrate and the clad. That is, the effective refraction indexes ($n_{TE}$ and $n_{TM}$) are different from each other between a TM polarized wave which has a polarization direction perpendicular to the substrate and a TE polarized wave which has a polarization direction parallel to the substrate. Here, an optical path length difference depending on the polarization $\Delta(BL)$ is given by the following formula.

[Formula 3]

$$\Delta(BL) = \int Bdl_1 - \int Bdl_2 \quad (3)$$

Here, $l_1$ and $l_2$ are coordinates along the two arm waveguides, respectively.

Further, $$\int Bdl_1 \text{ and } \int Bdl_2 \quad \text{[Formula 4]}$$

are the birefringence values integrated linearly along the arm waveguides, respectively.

Since the optical path length difference depending on the polarization $\Delta(BL)$ has a finite value, a polarization dependence is caused in the extinction wavelength. This polarization dependence causes the occurrence of polarization dependent loss (PDL) and polarization dependent frequency difference (PDf) and deteriorates signal quality considerably.

The following is known as methods for eliminating this polarization dependence.

(First Example of a Conventional Technique)

There is disclosed a Mach-Zehnder interferometer circuit in which a half-wave length plate corresponding to one half of the wavelength to be used is inserted on a straight line connecting the centers of the two arm waveguides with each other so as to have the principal axis thereof inclined at an angle of 45 degrees relative to the horizontal direction (or vertical line) of the substrate plane (refer to Non-patent document 2).

FIG. 2 shows a schematic diagram of the MZI in the first example of the conventional technique. An MZI 200 is provided with two couplers (222, 224) and two arm waveguides (206, 208) connecting the two couplers with each other. Further, the MZI 200 is provided with a half-wave length plate 232 disposed so as to divide each of the arm waveguides (206, 208) into two. In addition, the coupler 222 is provided with two input waveguides (202, 204) and the coupler 224 is provided with two output waveguides (210, 212).

In the MZI 200, an optical signal travels half the distance of the arm waveguide (206, 208) up to the half-wave length plate 232 in the TE polarization (or TM polarization) and is converted from the TE polarization to the TM polarization (or from the TM polarization to the TE polarization) in the half-wave length plate 232. Then, the optical signal travels the remaining half distance of the arm waveguide (206, 208) in the TM polarization (or TE polarization). The optical signals each converted from the TE polarization (or TM polarization) into the TM polarization (or TE polarization) have the optical path length difference from each other shown by the follow ing formula, and it is possible to eliminate the optical path length difference depending on the polarization Δ(BL).

$$n\Delta L = (n_{TE} + n_{TM}) \cdot \frac{\Delta L}{2} \qquad \text{[Formula 5]}$$

(Second Example of a Conventional Technique)

There is known a Mach-Zehnder interferometer circuit which sets the optical path length difference depending on the polarization Δ(BL) to be an integral multiple (including zero) of the optical wavelength to be used (refer to Patent document 1). This circuit sets the optical path length difference depending on the polarization Δ(BL) to be an integral multiple (including zero) of the wavelength to be used focusing on the fact that the interference condition of the TM polarization coincides with the interference condition of the TE polarization since the Mach-Zehnder interferometer cannot discriminate the phase difference of an integral multiple of the wavelength λ to be used.

However, the above described Mach-Zehnder interferometer circuits (hereinafter referred to as MZI) have the following problems.

The first example of the conventional technique is based on the assumption that the perfect polarization conversion is performed from the TE polarization into the TM polarization (or from the TM polarization into the TE polarization) by using the half-wave length plate. However, the film thickness of the half-wave length plate is shifted from a desired thickness because of fabrication error and does not coincide with the design wavelength. As a result, the polarization conversion is not performed perfectly from the TE polarization into the TM polarization and a part thereof remains as the TE polarization. When such a half-wave length plate is used, the optical path length difference of the TE polarized wave, which is input in the TE polarization and travels without performing the polarization conversion, becomes $n_{TE}\Delta L$, in the first example of the conventional technique. That is, the purpose of setting the optical path length difference to be the value shown by the following formula without depending on the polarization is not achieved and the polarization dependence occurs.

$$(n_{TE} + n_{TM}) \cdot \frac{\Delta L}{2} \qquad \text{[Formula 6]}$$

For example, when the frequency space (period) of the extinction wavelengths is defined as a FSR (Frequency Spectral Range) and the maximum value of the extinction wavelength difference depending on the polarization is defined as a PDf (Polarization Dependent Frequency), the PDf becomes as large as 0.4 GHz for both of the cross path and the through-path in the Mach-Zehnder interferometer circuit which is the first example of the conventional technique and has a FSR of 10 GHz. This PDf is required to be one hundredth or less of the FSR for the purpose of avoiding the degradation of the signal quality, and it is difficult to satisfy the specification by the conventional technique.

The second example of the conventional technique has a problem that the PDf has a large birefringence dependence. As a result, it is very difficult to satisfy the requirement that the PDf is one hundredth of the FSR and the temperature dependence also has a large PDf variation. This birefringence dependence will be briefly explained below.

The extinction frequencies of the TE polarized wave and the TM polarized wave for the through-path are defined as follows, respectively.

$$f_{TE}^{th}; \text{ and } f_{TM}^{th} \qquad \text{[Formula 7]}$$

The extinction frequencies satisfy the following formulas, respectively.

[Formula 8]

$$f_{TE}^{th} = mFSR_{TE} = \frac{mc}{n_{TE}\Delta L} \qquad (4)$$

$$f_{TM}^{th} = mFSR_{TM} = \frac{mc}{n_{TM}\Delta L} \qquad (5)$$

Here, m indicates an order number, $FSR_{TE}$ and $FSR_{TM}$ indicate the FSRs of the TE polarized light and the TM polarized light, respectively, and c indicates the light speed. By the use of the above two formulas, the PDf is converted into the following formula.

[Formula 9]

$$PDf = \frac{f_{avg}^{th}}{n_{avg}} B \quad \left(0 \le B \le \frac{1}{2}\frac{\lambda}{\Delta L}\right) \qquad (6)$$

Here, $$f_{avg}^{th} = \frac{f_{TE}^{th} + f_{TM}^{th}}{2}, \qquad \text{[Formula 10]}$$

$$n_{avg} = \frac{n_{TE} + n_{TM}}{2}, \; B = n_{TE} - n_{TM}$$

When the effective refraction index is 1.45 and the extinction frequency is 193 THz, the above formula provides a PDf variation of $133 \times 10^{12}$ relative to the birefringence. This means the PDf has a variation as large as 1.33 GHz when the birefringence varies by $0.1 \times 10^{-4}$, and it is found that the PDf has a large birefringence dependence. Accordingly, the birefringence needs to be adjusted highly accurately and it is very difficult to satisfy the condition that the PDf value is to be one hundredth of the FSR.

Meanwhile, internal stress applied to the waveguide is changed by environmental temperature because of thermal expansion coefficient difference between the substrate and the clad or thermal expansion coefficient difference between a board attaching the circuit and the circuit. As a result, the birefringence value is changed through the photo-elasticity effect and thereby the PDf is changed by the environmental temperature.

For example, in the Mach-Zehnder interferometer having a FSR of 10 GHz in which the birefringence is adjusted so as to reduce the PDf down to 0.33 GHz by using the second example of the conventional technique, there arises a problem that the PDf varies as large as 6 GHz when the environmental temperature is changed from −10° C. to 80° C.

The present invention has been achieved in view of such a problem, and an object thereof is to provide a polarization-independent waveguide-type optical interference circuit which suppresses the polarization dependence of a transmission spectrum and the temperature dependence regarding the polarization.

Patent document 1: Japanese Patent Laid-Open No. H06-60982 (1994)
Patent document 2: Japanese Patent Publication No. 3703013
Patent document 3: WO 01/059495
Non-patent document 1: K. Inoue et al., "A Four-Channel Optical Waveguide Multi/Demultiplexer for 5-GHz Spaced Optical FDM Transmission", JOURNAL OF LIGHTWAVE TECHNOLOGY, Vol. 6, No. 2, FEB. 1988, pp. 339-345
Non-patent document 2: Y. Inoue et al., "Elimination of Polarization Sensitivity in Silica-Based Wavelength Division Multiplexer Using a Polyimide Half waveplate", JOURNAL OF LIGHTWAVE TECHNOLOGY, Vol. 15, No. 10, October 1997, pp. 1947-1957
Non-patent document 3: B. L. Heffner, "Deterministic, Analytical Complete Measurement of Polarization-Dependent Transmission Through Optical Devices", IEEE PHOTONICS TECHNOLOGY LETTERS, VOL. 4, NO. 5, MAY 1992, pp. 451-454
Non-patent document 4: M. Okuno et al., "Birefringence Control of Silica Waveguides on Si and Its Application to a Polarization-Beam Splitter/Switch", JOURNAL OF LIGHTWAVE TECHNOLOGY, VOL. 12, NO. 4, APRIL. 1994, pp. 625-633

DISCLOSURE OF THE INVENTION

A first aspect of the present invention is an optical signal processing device comprising a Mach-Zehnder interferometer circuit, the Mach-Zehnder interferometer circuit comprising two couplers and two arm waveguides, each fabricated on a substrate, the two arm waveguides connecting the two couplers with each other, the Mach-Zehnder interferometer circuit comprising a polarization rotation device disposed in a groove dividing each of the two arm waveguides into two, the polarization rotation device for converting horizontally polarized light into vertically polarized light and converting vertically polarized light into horizontally polarized light, wherein a difference between values divided by an optical wavelength to be used is within a range of 2 m−0.2 to 2 m+0.2 (m is an integer including zero), the values being curvilinear integrals of the birefringence along the respective two arm waveguides in an optical signal travelling direction.

A second aspect of the present invention is an optical processing device comprising a Mach-Zehnder interferometer circuit, the Mach-Zehnder interferometer circuit comprising two couplers and two arm waveguides, each fabricated on a substrate, the two arm waveguides connecting the two couplers with each other, the Mach-Zehnder interferometer circuit comprising two polarization rotation devices each disposed in a groove dividing each of the two arm waveguides into two, the polarization rotation device for converting horizontally polarized light into vertically polarized light and converting vertically polarized light into horizontally polarized light, wherein phases of an optical signal converted by one of the polarization rotation devices and an optical signal converted by the other one of the polarization rotation devices are shifted from each other by n and a difference between birefringence values divided by an optical wavelength to be used is within a range of (2 m−1)−0.2 to (2 m−1)+0.2 (m is an integer including zero), the birefringence values being curvilinear integrals of the birefringence along the respective two arm waveguides in an optical signal travelling direction.

In an embodiment of the present invention, the polarization rotation device of the optical signal processing device in the first aspect is a half-wave length plate disposed in such a manner that an optical principal axis thereof is slanted at an angle of 45 degrees relative to a vertical line of the substrate plane and is also perpendicular to the optical signal travelling direction.

In an embodiment of the present invention, the two polarization rotation devices of the optical signal processing devices in the second aspect are half-wave length plates disposed in such a manner that each of optical principal axes thereof is slanted at an angle of 45 degrees relative to a vertical line of the substrate plane and is also perpendicular to the light travelling direction, in which the optical principal axis in one of the polarization rotation devices and the optical principal axis in the other one of the polarization rotation devices are perpendicular to each other.

In an embodiment of the present invention, the coupler of the optical signal processing device in the first and second aspects is a directional coupler or a multimode interference-type coupler.

In an embodiment of the present invention, at least one of the two arm waveguides of the optical signal processing device in the first and second aspects has a width changing partially, whereby the birefringence is adjusted such that the difference between the birefringence values becomes a desired value, the birefringence values being curvilinear integrals of the birefringence along the respective two arm waveguides in the optical signal travelling direction.

In an embodiment of the present invention, at least one of the two arm waveguides of the optical signal processing device in the first and second aspects is partially irradiated with laser, thereby the birefringence is adjusted such that the difference between the birefringence values becomes a desired value, the birefringence values being curvilinear integrals of the birefringence along the respective two arm waveguides in the optical signal travelling direction.

In an embodiment of the present invention, at least one of the two arm waveguides of the optical signal processing device in the first and second aspects has stress-releasing grooves formed partially at both sides thereof, thereby the birefringence is adjusted such that the difference between the birefringence values becomes a desired value, the birefringence values being curvilinear integrals of the birefringence along the respective two arm waveguides in the optical signal travelling direction.

In an embodiment of the present invention, at least one of the two arm waveguides of the optical signal processing device in the first and second aspects has a stress-applying film formed over an upper surface thereof, thereby the birefringence is adjusted such that the difference between the birefringence values becomes a desired value, the birefringence values being curvilinear integrals along the respective two arm waveguides in the optical signal travelling direction.

In an embodiment of the present invention, at least one of the two arm waveguides of the optical signal processing device in the first and second aspects has a thin film heater formed thereover for changing stress, thereby the birefringence is adjusted such that the difference between the birefringence values becomes a desired value, the birefringence values being curvilinear integrals of the birefringence along the respective two arm waveguides in the optical signal travelling direction.

According to the present invention, it becomes possible to provide a polarization-independent waveguide-type optical interference circuit which suppresses the polarization dependence of the transmission spectrum and the temperature dependence regarding the polarization.

BEST MODE FOR CARRYING OUT THE INVENTION

Hereinafter, embodiments of the present invention will be explained in detail with reference to the drawings.

Figure 1:
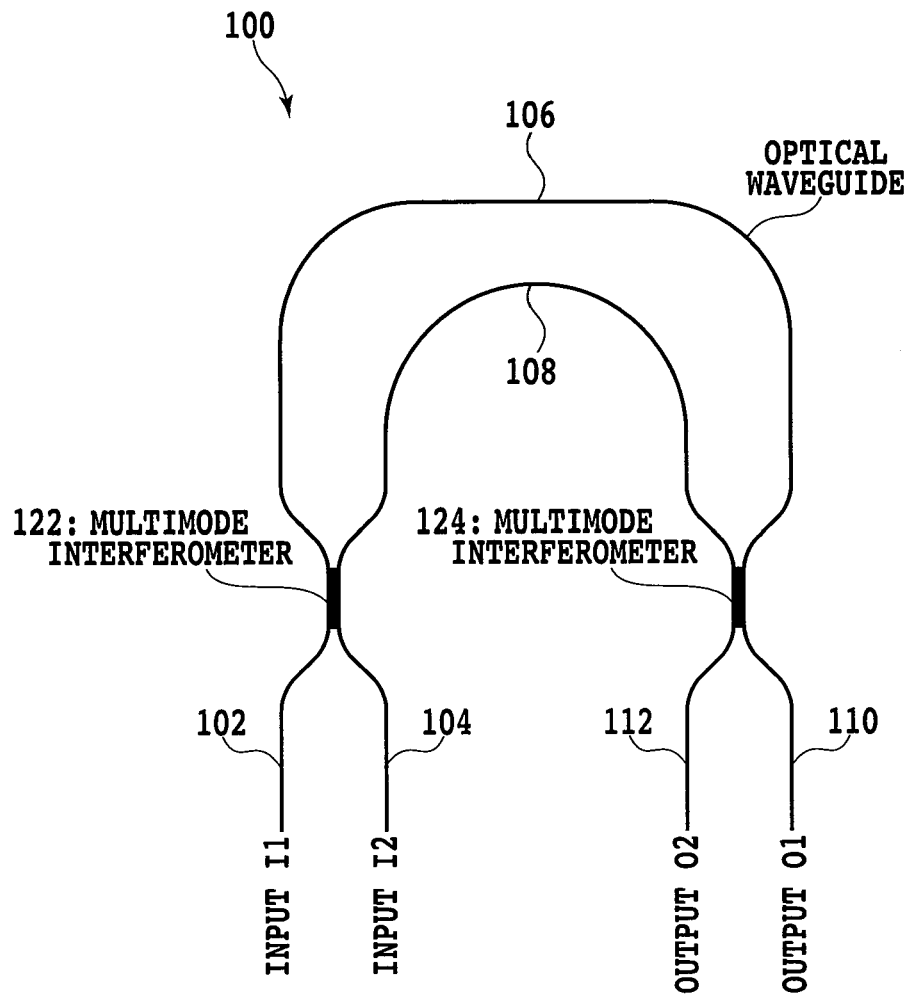
FIG. 1 is a schematic diagram of a Mach-Zehnder interferometer circuit using an optical waveguide.
Figure 2:
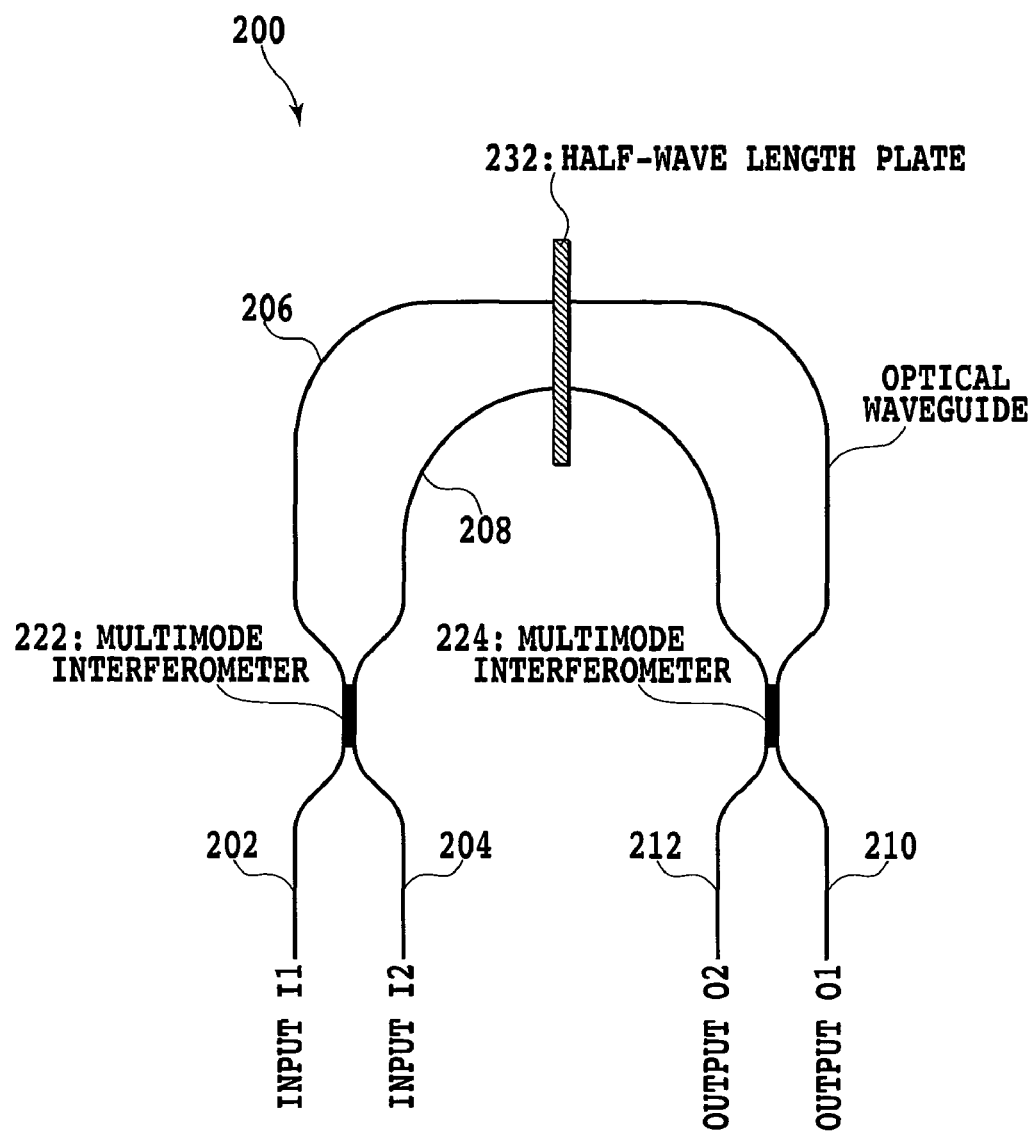
FIG. 2 is a schematic diagram of a Mach-Zehnder interferometer circuit in a first example of a conventional technique.
Figure 3:
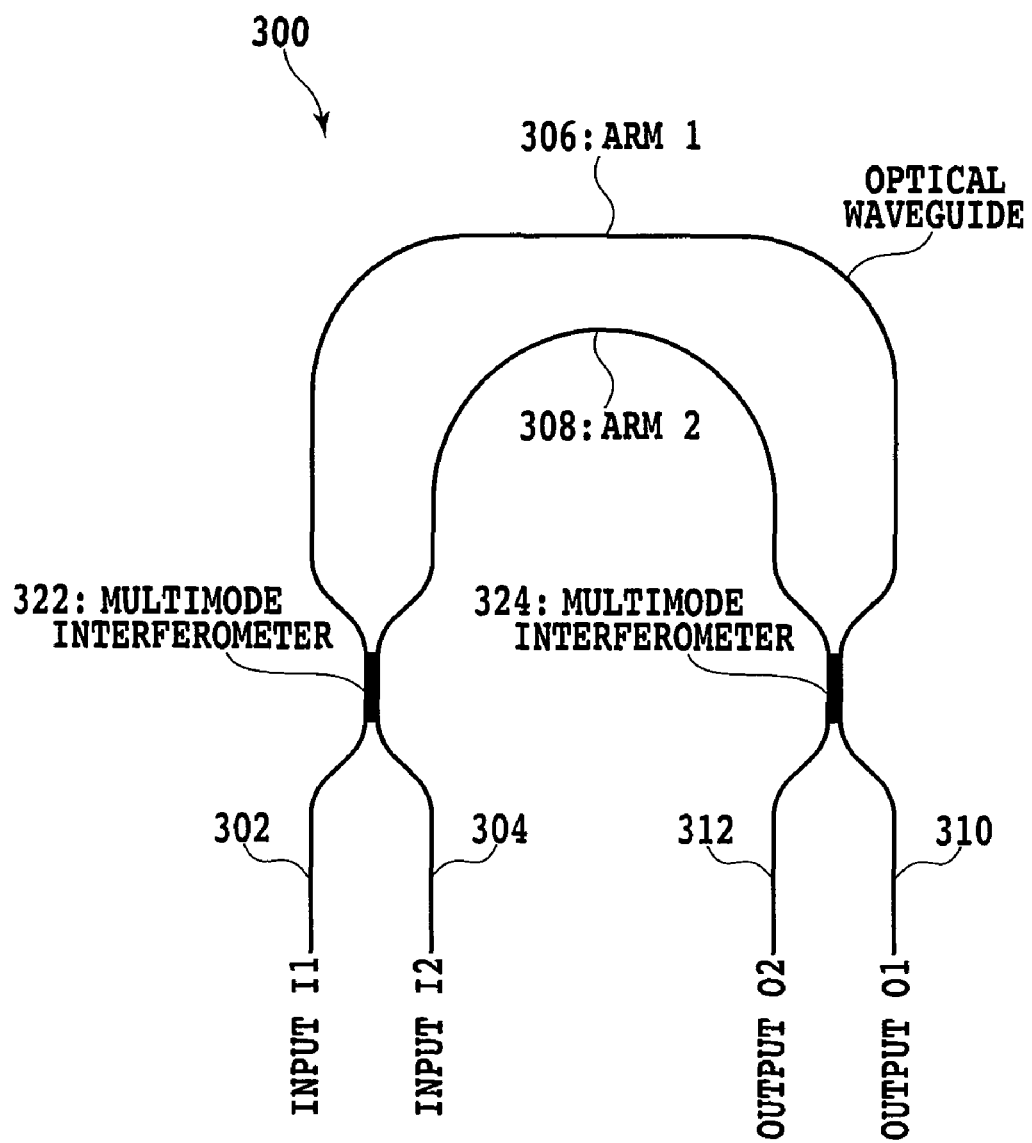
FIG. 3 is a diagram for explaining a condition for a polarization independent transmission spectrum.

First, with reference to FIG. 3, there will be explained a polarization-independent condition of a transmission spectrum even when the operation wavelength of the half-wave length plate is shifted from the design wavelength.

The problem is that the optical path length difference of the polarized waves which are not converted into the other polarization and the optical path length difference of the polarized waves which are converted into the other polarization do not coincide with each other when the operation wavelength of the half-wave length plate is shifted from the design wavelength. Accordingly, these optical path length differences are attempted to be made apparently the same.

Specifically, a difference between the optical path length difference $n_{TE}\Delta L$ of TE polarized waves which are input in the TE polarization and travel without the polarization conversion, and the optical path length difference, given by the following formula, of the polarized waves which are input in the TM polarization and travel in the TE polarization after the polarization conversion by the half-wave length plate is made to be zero or an integral multiple of the wavelength to be used.

$$(n_{TE} + n_{TM}) \cdot \frac{\Delta L}{2} \qquad \text{[Formula 11]}$$

At the same time, a difference between the optical path length difference $n_{TM}\Delta L$ of TM polarized waves which are input in the TM polarization and travel without the polarization conversion, and the optical path length difference, given by the following formula, of the polarized waves which are input in the TE polarization and travels in the TM polarization after the polarization conversion is made to be zero or an integral multiple of the wavelength to be used.

$$(n_{TE} + n_{TM}) \cdot \frac{\Delta L}{2} \qquad \text{[Formula 12]}$$

This will be explained more specifically by the use of formulas.

<Case of Principal Axes of the Half-Wave Length Plates Directed in the Same Direction/Through-Path>

An optical output which is the output of the wave after travelling through I1, the arm 1, and O1 is given by Formula (7) in the MZI, which is the Mach-Zehnder interferometer having half-wave length plates inserted in the centers of two arm waveguides, respectively, in which the direction of the optical principal axis of each half-wave length plate is slanted at an angle of 45 degrees relative to a perpendicular line (vertical line) against the substrate plane and is perpendicular to a travelling direction of the optical signal, and the half-wave length plates inserted in the arm waveguides have the optical principal axes in the same direction, respectively.

[Formula 13]

$$\frac{\sqrt{2}}{2}\begin{pmatrix} e^{-j\frac{\phi_{TE}}{2}} & 0 \\ 0 & e^{-j\frac{\phi_{TM}}{2}} \end{pmatrix} \frac{\sqrt{2}}{2}\begin{pmatrix} 1 & -1 \\ 1 & 1 \end{pmatrix}\begin{pmatrix} e^{-j\psi} & 0 \\ 0 & 1 \end{pmatrix}\frac{\sqrt{2}}{2}\begin{pmatrix} 1 & 1 \\ -1 & 1 \end{pmatrix}\begin{pmatrix} e^{-j\frac{\phi_{TE}}{2}} & 0 \\ 0 & e^{-j\frac{\phi_{TM}}{2}} \end{pmatrix}\frac{\sqrt{2}}{2}\begin{pmatrix} I_{TE} \\ I_{TM} \end{pmatrix} \qquad (7)$$

Here, $\phi_{TE}$ and $\phi_{TM}$ are phase differences between the two arm waveguides for the TE polarized wave and the TM polarized wave, respectively, $\Psi$ is a phase difference provided by the half-wave length plate. Note that the coupling ratio of the coupler is assumed to be 50% and, from the assumption that the wave length plate has a shift from the design wavelength, $\Psi$ is assumed to take a value except π and an integral multiple thereof. Further, an optical output which is the output of the wave after travelling through I1, the arm 2, and O1 is given by Formula (8).

[Formula 14]

$$-\frac{\sqrt{2}}{2}\frac{\sqrt{2}}{2}\begin{pmatrix} 1 & -1 \\ 1 & 1 \end{pmatrix}\begin{pmatrix} e^{-j\psi} & 0 \\ 0 & 1 \end{pmatrix}\frac{\sqrt{2}}{2}\begin{pmatrix} 1 & 1 \\ -1 & 1 \end{pmatrix}\frac{\sqrt{2}}{2}\begin{pmatrix} I_{TE} \\ I_{TM} \end{pmatrix} \qquad (8)$$

By the use of Formulas (7) and (8), an optical output of the through-path is given by Formula (9).

[Formula 15]

$$\begin{pmatrix} O_{TE}^{th} \\ O_{TM}^{th} \end{pmatrix} = \frac{1}{4} \begin{pmatrix} I_{TE}(e^{-j\phi_{TE}} - 1)(e^{-j\psi} + 1) + \\ I_{TM}\left(e^{-j\frac{\phi_{TE}+\phi_{TM}}{2}} - 1\right)(e^{-j\psi} - 1) \\ I_{TE}\left(e^{-j\frac{\phi_{TE}+\phi_{TM}}{2}} - 1\right)(e^{-j\psi} - 1) + \\ I_{TM}(e^{-j\phi_{TM}} - 1)(e^{-j\psi} + 1) \end{pmatrix} \quad (9)$$

In Formula (9), the polarization-independent condition at the extinct wavelength is obtained when the following formula is satisfied.

[Formula 16]

$$\begin{pmatrix} O_{TE}^{th} \\ O_{TM}^{th} \end{pmatrix} = \begin{pmatrix} 0 \\ 0 \end{pmatrix}$$

That is, the following formulas may be satisfied.

[Formula 17]

$$\phi_{TE} = 2m\pi \quad (10)$$

$$\phi_{TM} = 2n\pi \quad (11)$$

$$\frac{\phi_{TE} + \phi_{TM}}{2} = 2\alpha\pi \quad (12)$$

Here, m, n, and α each indicate integers and thus the following formulas are obtained.

[Formula 18]

$$\frac{\phi_{TE} + \phi_{TM}}{2} = 2(\alpha - n)\pi = 2n'\pi \quad (13)$$

$$\frac{\phi_{TE} + \phi_{TM}}{2} = 2\alpha\pi \quad (14)$$

Formula (13) is converted into Formula (15).

[Formula 19]

$$\phi_{TE} - \phi_{TM} = \left\{ \begin{pmatrix} \int n_{TE} dl_1 - \int n_{TE} dl_2 \end{pmatrix} - \\ \begin{pmatrix} \int n_{TM} dl_1 - \int n_{TM} dl_2 \end{pmatrix} \right\} \frac{2\pi}{\lambda}$$

$$= \left\{ \int B dl_1 - \int B dl_2 \right\} \frac{2\pi}{\lambda}$$

$$= 4n'\pi \quad (15)$$

By being rewritten further, Formula (16) is derived.

[Formula 20]

$$\int B dl_1 - \int B dl_2 = 2n'\lambda \quad (16)$$

From the above formula, the polarization independence is found to be obtained when the optical path length difference depending on the polarization becomes an even number order of the extinction wavelength (wavelength to be used).

Generally, the birefringence value of the waveguide varies because of the fabrication error. However, a certain extent of variation is allowed for satisfying the target condition such that the PDf is to be one hundredth of the FSR.

Accordingly, an acceptable value of the birefringence will be obtained for attaining the target PDf (or order number of the optical path length difference depending on the polarization).

When the Jones matrix of the MZI is M, the maximum value and the minimum value of the optical output at a certain wavelength are derived by obtaining an eigenvalue for the product of the complex conjugate transposed matrix of M $(M^*)^T$ and M (refer to Non-patent document 3). By the use of Formula (9), the Jones matrix of the MZI is expressed as follows.

[Formula 21]

$$M = \frac{1}{4} \begin{pmatrix} (e^{-j\phi_{TE}} - 1)(e^{-j\psi} + 1) & \left(e^{-j\frac{\phi_{TE}+\phi_{TM}}{2}} - 1\right)(e^{-j\psi} - 1) \\ \left(e^{-j\frac{\phi_{TE}+\phi_{TM}}{2}} - 1\right)(e^{-j\psi} - 1) & (e^{-j\phi_{TM}} - 1)(e^{-j\psi} + 1) \end{pmatrix} \quad (17)$$

The eigenvalue of $(M^*)^T M$ is calculated for a wavelength (or frequency) and the PDf is derived by the calculation of a spectrum around 1.55 μm.

Figure 4A:
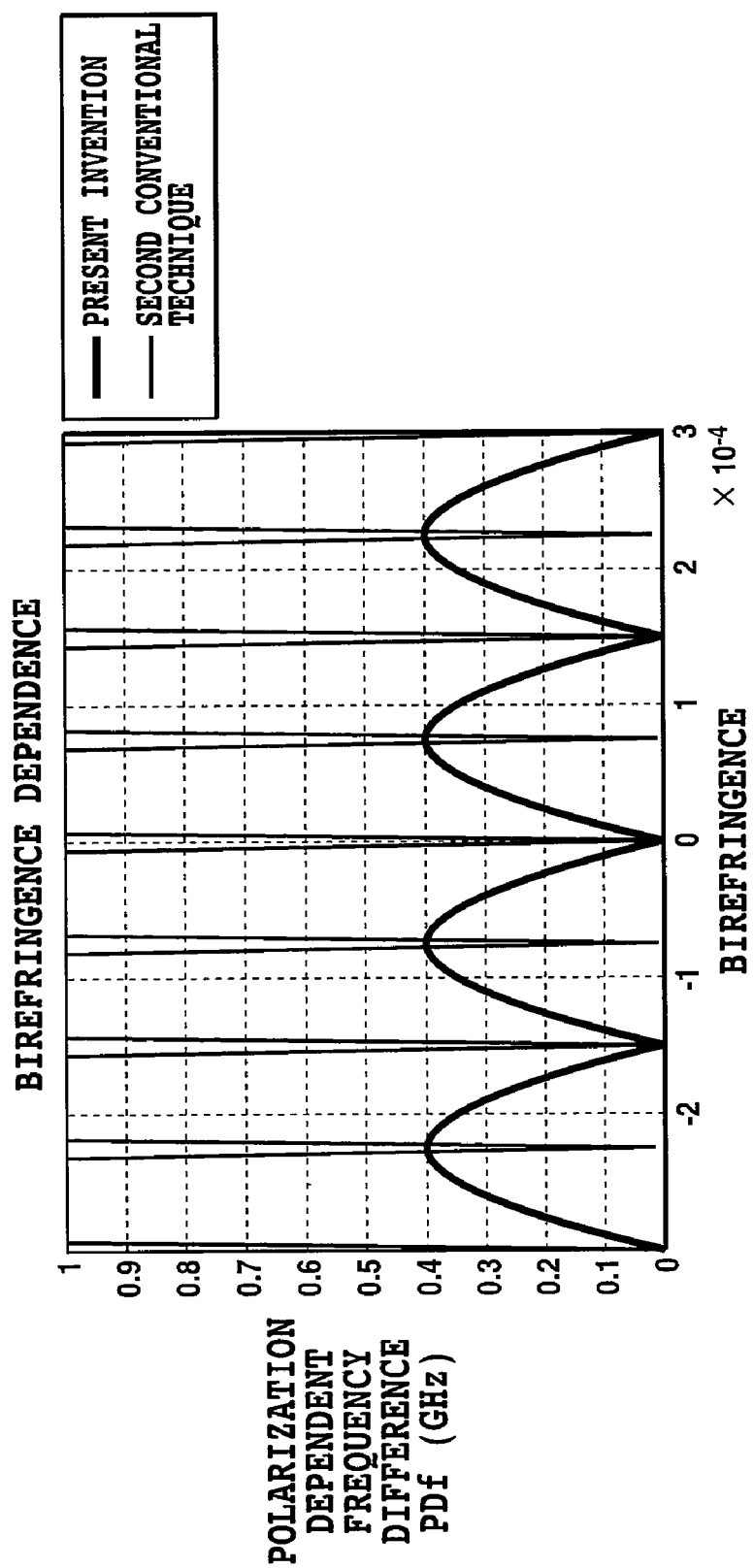
FIG. 4A is a diagram showing a calculation result of a PDf dependence on a birefringence when an operation wavelength of a half-wave length plate is shifted from a wavelength to be used by 4%.
Figure 4B:
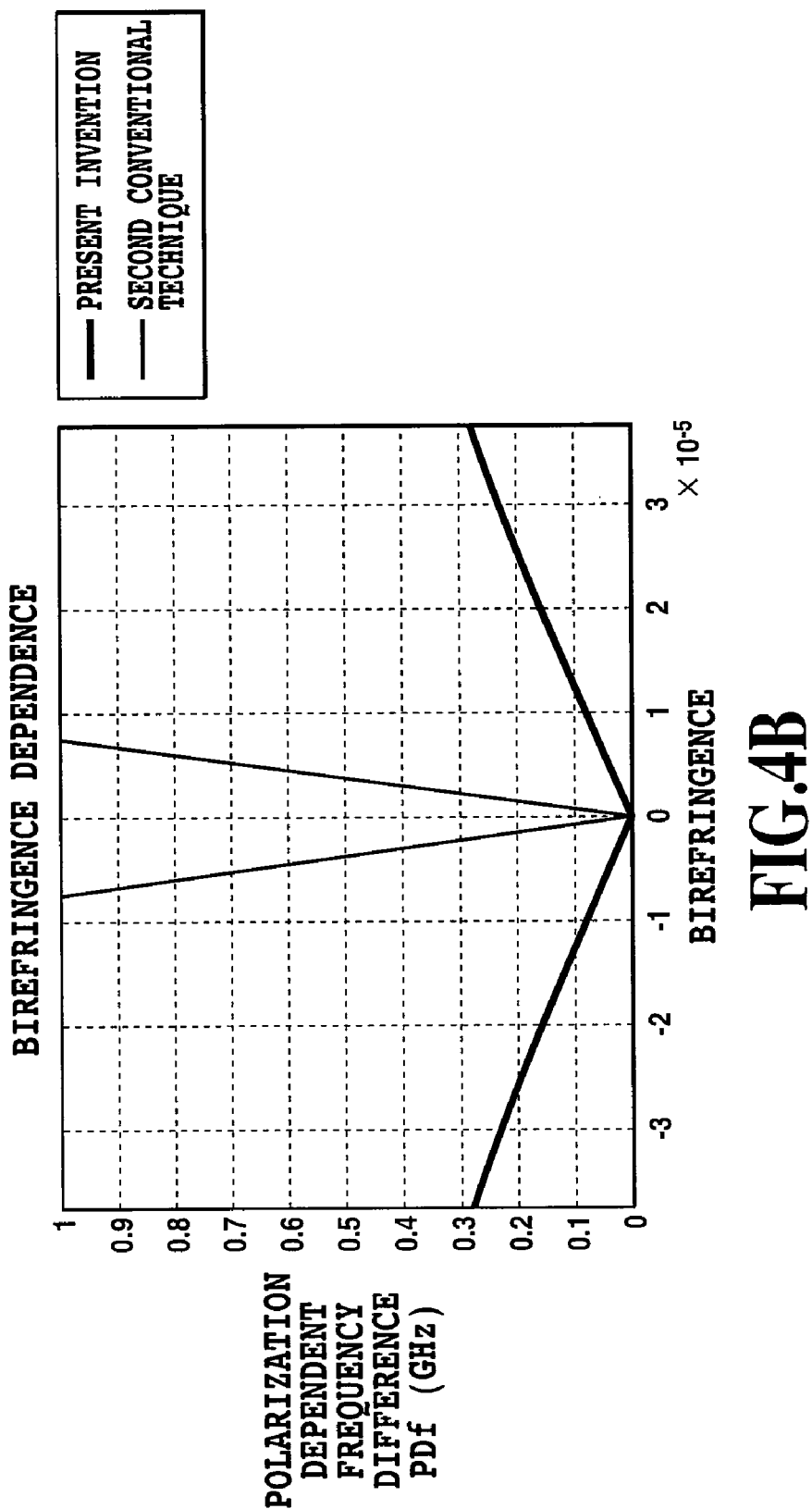
FIG. 4B is an enlarged diagram of FIG. 4A.

FIGS. 4A and 4B show a calculation result of a relationship between the PDf and the birefringence when the operation wavelength of the half-wave length plate is shifted from the wavelength to be used. The calculation assumes that the coupling ratio of the coupler is 50% and the operation wavelength of the half-wave length plate is shifted by 4% from the wavelength to be used. This is because the operating wavelength of the half-wave length plate used by the inventors has an error of 4% (standard deviation) from the design wavelength. FIGS. 4A and 4B show that the variation of the birefringence may be $\pm 0.1 \times 10^{-4}$ or less for making the PDf one hundredth of the FSR in the present invention.

Figure 5A:
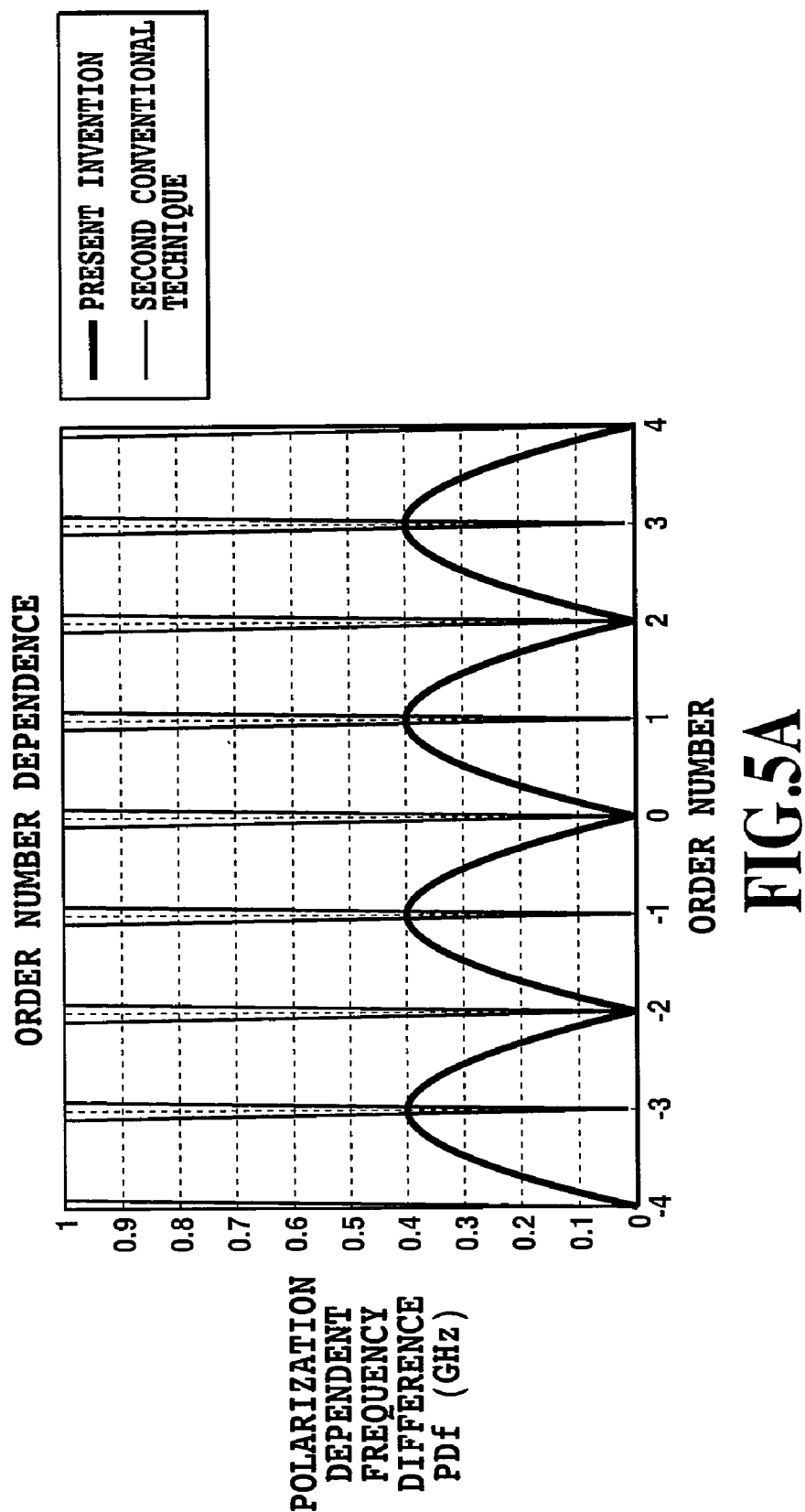
FIG. 5A is a diagram in which the horizontal axis of FIG. 4A is expressed by an order number.
Figure 5B:
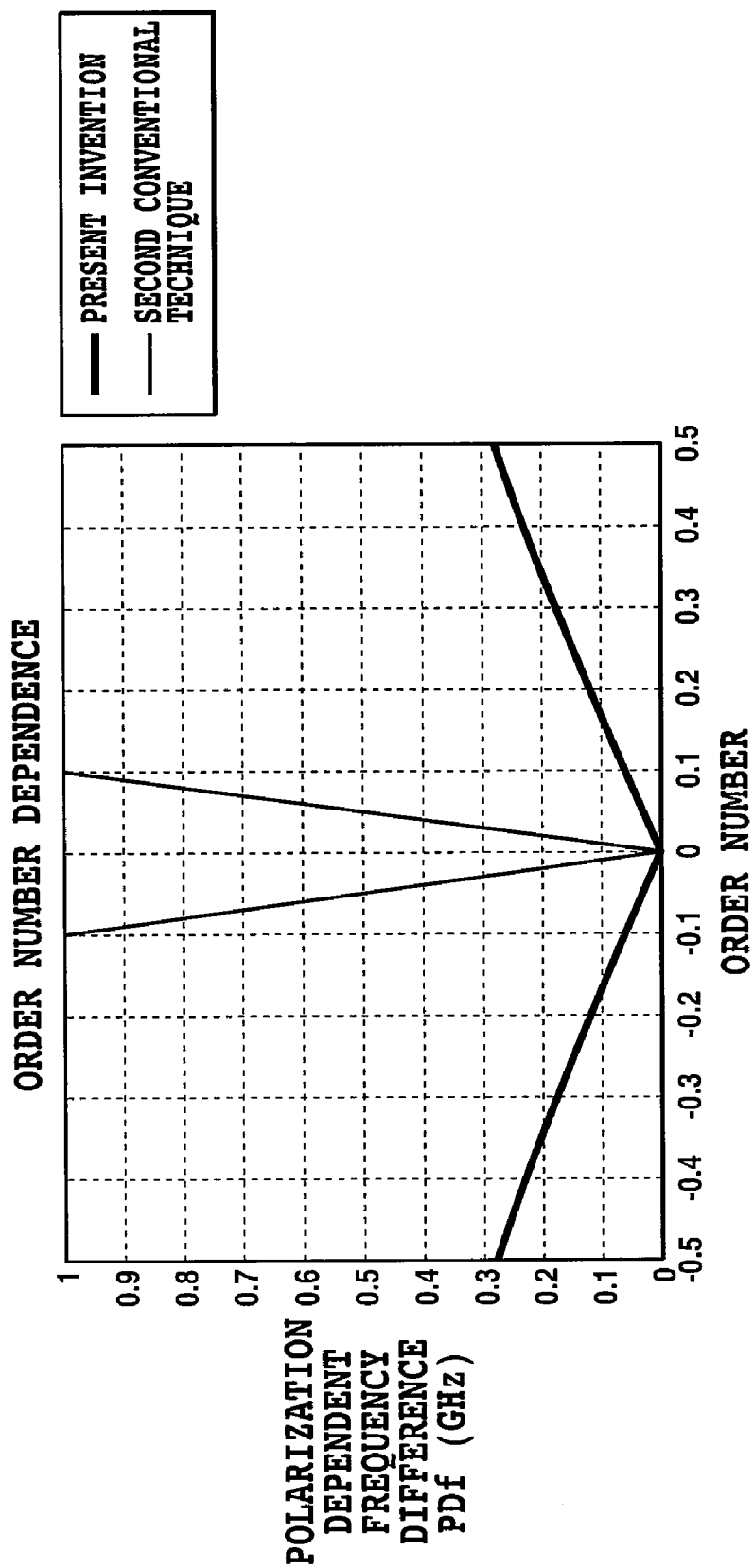
FIG. 5B is an enlarged diagram of FIG. 5A.

FIGS. 5A and 5B show graphs in which each of the horizontal axes of respective FIGS. 4A and 4B is expressed by an order number (value of the optical path length difference depending on the polarization Δ(BL) divided by the wavelength to be used). FIGS. 5A and 5B show that the acceptable variation of the order number is within a range of ±0.2 order.

Similarly, the change of the PDf caused by the environmental temperature change can be analogized by the use of FIGS. 4A and 4B.

In FIGS. 4A and 4B, the bold line and the fine line indicate the birefringence dependences of the PDf in the present invention and the second example of the conventional technique, respectively. The birefringence dependence of the PDf in the present invention is found to be relaxed in comparison with the second example of the conventional technique. That is, since the birefringence is changed by the environmental temperature, it is found that the environmental temperature dependence of the PDf is relaxed.

<Case of Principal Axes of the Half-Wave Length Plates Directed in the Same Direction/Cross Path>

Similarly for the cross pass, the condition of the polarization independence can be calculated at the extinction wavelength.

An optical output which is the output of the wave after traveling through I1, the arm 1, and O2 is given by Formula (18).

[Formula 22]

$$-j\frac{\sqrt{2}}{2}\begin{pmatrix} e^{-j\frac{\phi_{TE}}{2}} & 0 \\ 0 & e^{-j\frac{\phi_{TM}}{2}} \end{pmatrix}\frac{\sqrt{2}}{2}\begin{pmatrix} 1 & -1 \\ 1 & 1 \end{pmatrix}\begin{pmatrix} e^{-j\psi} & 0 \\ 0 & 1 \end{pmatrix}\frac{\sqrt{2}}{2}\begin{pmatrix} 1 & 1 \\ -1 & 1 \end{pmatrix}\begin{pmatrix} e^{-j\frac{\phi_{TE}}{2}} & 0 \\ 0 & e^{-j\frac{\phi_{TM}}{2}} \end{pmatrix}\frac{\sqrt{2}}{2}\begin{pmatrix} I_{TE} \\ I_{TM} \end{pmatrix} \quad (18)$$

Here, $\phi_{TE}$ and $\phi_{TM}$ are phase differences between the two arm waveguides for the TE polarized wave and the TM polarized wave, respectively, and $\Psi$ is a phase difference provided by the half-wave length plate. The coupling ratio of the coupler is assumed to be 50%. Further, an optical output which is the output of the wave after travelling through I1, the arm 2, and O2 is given by Formula (19).

[Formula 23]

$$-j\frac{\sqrt{2}}{2}\frac{\sqrt{2}}{2}\begin{pmatrix} 1 & -1 \\ 1 & 1 \end{pmatrix}\begin{pmatrix} e^{-j\psi} & 0 \\ 0 & 1 \end{pmatrix}\frac{\sqrt{2}}{2}\begin{pmatrix} 1 & 1 \\ -1 & 1 \end{pmatrix}\frac{\sqrt{2}}{2}\begin{pmatrix} I_{TE} \\ I_{TM} \end{pmatrix} \quad (19)$$

By the use of the above two formulas, the optical output for the cross path is expressed by Formula (20).

[Formula 24]

$$\begin{pmatrix} O_{TE}^\alpha \\ O_{TM}^\alpha \end{pmatrix} = -j\frac{1}{4}\begin{pmatrix} (e^{-j\psi}+1)I_{TE}(e^{-j\phi_{TE}}+1) + \\ (e^{-j\psi}-1)I_{TM}\left(e^{-j\frac{\phi_{TE}+\phi_{TM}}{2}}+1\right) \\ (e^{-j\psi}-1)I_{TE}\left(e^{-j\frac{\phi_{TE}+\phi_{TM}}{2}}+1\right) + \\ (e^{-j\psi}+1)I_{TM}(e^{-j\phi_{TM}}+1) \end{pmatrix} \quad (20)$$

In Formula (20), the polarization-independent condition at the extinction wavelength is obtained when the following formula is satisfied.

[Formula 25]

$$\begin{pmatrix} O_{TE}^{th} \\ O_{TM}^{th} \end{pmatrix} = \begin{pmatrix} 0 \\ 0 \end{pmatrix}$$

That is, the following formulas may be satisfied.

[Formula 26]

$$\phi_{TE} = (2m+1)\pi \quad (21)$$

$$\phi_{TM} = (2n+1)\pi \quad (22)$$

$$\frac{\phi_{TE}+\phi_{TM}}{2} = (2\alpha+1)\pi \quad (23)$$

Here, m, n, and $\alpha$ each indicate integers and the following formulas are obtained.

[Formula 27]

$$\frac{\phi_{TE}-\phi_{TM}}{2} = 2(\alpha-n)\pi = 2n'\pi \quad (24)$$

$$\frac{\phi_{TE}+\phi_{TM}}{2} = (2\alpha+1)\pi \quad (25)$$

By being rewritten further, Formula (26) is derived.

[Formula 28]

$$\int Bdl_1 - \int Bdl_2 = 2n'\lambda \quad (26)$$

The above formula shows that the polarization independence is obtained when the optical path length difference depending on the polarization becomes an even number order at a certain extinction wavelength.

<Case of Principal Axes of the Half-Wave Length Plates being Perpendicular to Each Other/Through-Path>

An optical output which is the output of the wave after travelling through I1, the arm 1, and O1 is given by Formula (27) in the MZI, which is the Mach-Zehnder interferometer having half-wave length plates inserted in the centers of two arm waveguides, respectively, in which the optical principal axis direction of each of the half-wave length plates is slanted at an angle of 45 degrees relative to a line (vertical line) perpendicular to the substrate plane and is perpendicular to a travelling direction of the optical signal, and the half-wave length plates inserted in the respective arm waveguides have the optical principal axes perpendicular to each other.

[Formula 29]

$$\frac{\sqrt{2}}{2}\begin{pmatrix} e^{-j\frac{\phi_{TE}}{2}} & 0 \\ 0 & e^{-j\frac{\phi_{TM}}{2}} \end{pmatrix}\frac{\sqrt{2}}{2}\begin{pmatrix} 1 & -1 \\ 1 & 1 \end{pmatrix}\begin{pmatrix} e^{-j\psi} & 0 \\ 0 & 1 \end{pmatrix} \quad (27)$$

$$\frac{\sqrt{2}}{2}\begin{pmatrix} 1 & 1 \\ -1 & 1 \end{pmatrix}\begin{pmatrix} e^{-j\frac{\phi_{TE}}{2}} & 0 \\ 0 & e^{-j\frac{\phi_{TM}}{2}} \end{pmatrix}\frac{\sqrt{2}}{2}\begin{pmatrix} I_{TE} \\ I_{TM} \end{pmatrix}$$

Further, an optical output which is the output of the wave after travelling through I1, the arm 2, and O1 is given by Formula (28).

[Formula 30]

$$-\frac{\sqrt{2}}{2}\frac{\sqrt{2}}{2}\begin{pmatrix} 1 & 1 \\ -1 & 1 \end{pmatrix}\begin{pmatrix} e^{-j\psi} & 0 \\ 0 & 1 \end{pmatrix}\frac{\sqrt{2}}{2}\begin{pmatrix} 1 & -1 \\ 1 & 1 \end{pmatrix}\frac{\sqrt{2}}{2}\begin{pmatrix} I_{TE} \\ I_{TM} \end{pmatrix} \quad (28)$$

By the use of Formulas (27) and (28), an optical output of the through-path is given by Formula (29).

[Formula 31]

$$\begin{pmatrix} O_{TE}^{th} \\ O_{TM}^{th} \end{pmatrix} = \quad (29)$$

$$\frac{1}{4}\begin{pmatrix} (e^{-j\psi}+1)I_{TE}(e^{-j\phi_{TE}}-1) + (e^{-j\psi}-1)I_{TM}\left(e^{-j\frac{\phi_{TE}+\phi_{TM}}{2}}+1\right) \\ (e^{-j\psi}-1)I_{TE}\left(e^{-j\frac{\phi_{TE}+\phi_{TM}}{2}}+1\right) + (e^{-j\psi}+1)I_{TM}(e^{-j\phi_{TM}}-1) \end{pmatrix}$$

In Formula (29), the polarization-independent condition at the extinction wavelength is obtained when the following formula is satisfied.

[Formula 32]
$$\begin{pmatrix} O_{TE}^{th} \\ O_{TM}^{th} \end{pmatrix} = \begin{pmatrix} 0 \\ 0 \end{pmatrix}$$

That is, the following formulas may be satisfied.

[Formula 33]
$$\phi_{TE} = 2m\pi \quad (30)$$
$$\phi_{TM} = 2n\pi \quad (31)$$
$$\frac{\phi_{TE} + \phi_{TM}}{2} = \pi(2\alpha + 1) \quad (32)$$

Here, m, n, and α each indicate integers and thus the following formulas are obtained.

[Formula 34]
$$\frac{\phi_{TE} - \phi_{TM}}{2} = \{2(\alpha - n) + 1\}\pi = (2n' + 1)\pi \quad (33)$$
$$\frac{\phi_{TE} + \phi_{TM}}{2} = \pi(2\alpha + 1) \quad (34)$$

By being rewritten further, Formula (35) is derived.

[Formula 35]
$$\int B dl_1 - \int B dl_2 = (2n'+1)\lambda \quad (35)$$

This formula shows that the polarization independence is obtained when the optical path length difference depending on the polarization becomes an odd number order at a certain extinction wavelength.

<Case of Principal Axes of the Half-Wave Length Plates Being Perpendicular to Each Other/Cross Path>

For the cross pass, a condition of the polarization independence can be calculated similarly.

An optical output which is the output of the wave after traveling through I1, the arm 1, and O2 is given by Formula (36).

[Formula 36]
$$-j\frac{\sqrt{2}}{2} \begin{pmatrix} e^{-j\frac{\phi_{TE}}{2}} & 0 \\ 0 & e^{-j\frac{\phi_{TM}}{2}} \end{pmatrix} \frac{\sqrt{2}}{2} \begin{pmatrix} 1 & -1 \\ 1 & 1 \end{pmatrix}$$
$$\begin{pmatrix} e^{-j\psi} & 0 \\ 0 & 1 \end{pmatrix} \frac{\sqrt{2}}{2} \begin{pmatrix} 1 & 1 \\ -1 & 1 \end{pmatrix} \begin{pmatrix} e^{-j\frac{\phi_{TE}}{2}} & 0 \\ 0 & e^{-j\frac{\phi_{TM}}{2}} \end{pmatrix} \frac{\sqrt{2}}{2} \begin{pmatrix} I_{TE} \\ I_{TM} \end{pmatrix} \quad (36)$$

Here, $\phi_{TE}$ and $\phi_{TM}$ are phase differences between the two arm waveguides for the TE polarized wave and the TM polarized wave, respectively, and Ψ is a phase difference provided by the half-wave length plate. The coupling ratio of the coupler is assumed to be 50%. Further, an optical output which is the output of the wave after travelling through I1, arm 2, and O2 is given by Formula (37).

[Formula 37]
$$-j\frac{\sqrt{2}}{2}\frac{\sqrt{2}}{2}\begin{pmatrix} 1 & 1 \\ -1 & 1 \end{pmatrix}\begin{pmatrix} e^{-j\psi} & 0 \\ 0 & 1 \end{pmatrix}\frac{\sqrt{2}}{2}\begin{pmatrix} 1 & -1 \\ 1 & 1 \end{pmatrix}\frac{\sqrt{2}}{2}\begin{pmatrix} I_{TE} \\ I_{TM} \end{pmatrix} \quad (37)$$

By the use of the above two formulas, the optical output for the thr cross path is expressed by Formula (38).

[Formula 38]
$$\begin{pmatrix} O_{TE}^{cr} \\ O_{TM}^{cr} \end{pmatrix} = \quad (38)$$
$$-j\frac{1}{4}\begin{pmatrix} I_{TE}(e^{-j\phi_{TE}} - 1)(e^{-j\psi} + 1) + I_{TM}\left(e^{-j\frac{\phi_{TE}+\phi_{TM}}{2}} + 1\right)(e^{-j\psi} - 1) \\ I_{TE}\left(e^{-j\frac{\phi_{TE}+\phi_{TM}}{2}} + 1\right)(e^{-j\psi} - 1) + I_{TM}(e^{-j\phi_{TM}} - 1)(e^{-j\psi} + 1) \end{pmatrix}$$

In Formula (38), the polarization-independent condition at the extinction wavelength is obtained when the following formula is satisfied.

[Formula 39]
$$\begin{pmatrix} O_{TE}^{cr} \\ O_{TM}^{cr} \end{pmatrix} = \begin{pmatrix} 0 \\ 0 \end{pmatrix}$$

That is, the following formulas may be satisfied.

[Formula 40]
$$\phi_{TE} = 2m\pi \quad (39)$$
$$\phi_{TM} = 2n\pi \quad (40)$$
$$\frac{\phi_{TE} + \phi_{TM}}{2} = \pi(2\alpha + 1) \quad (41)$$

Accordingly, the following formulas are obtained.

[Formula 41]
$$\frac{\phi_{TE} - \phi_{TM}}{2} = \{2(\alpha - n) + 1\}\pi = (2n' + 1)\pi \quad (42)$$
$$\frac{\phi_{TE} + \phi_{TM}}{2} = \pi(2\alpha + 1) \quad (43)$$

By being rewritten further, Formula (44) is derived.

[Formula 42]
$$\int B dl_1 - \int B dl_2 = (2n'+1)\lambda \quad (44)$$

The above formula shows that the polarization independence is obtained when the optical path length difference depending on the polarization becomes an odd number order at a certain extinction wavelength.

In the following, embodiments of the present invention will be explained in detail with reference to the drawings.

Note that the explanation in the following will be provided by taking as an example a silica optical waveguide formed on a silicon substrate for the optical waveguide. This is because this combination is suitable for the fabrication of the optical waveguide which is stable and has a distinguished reliability.

However, the present invention is not limited to this combination and it is needless to say that the combination may be a silica optical waveguide, an optical waveguide such as a silicon-oxide/nitride (SiON) film, an organic optical waveguide such as PMMA (Polymethylmethacrylate) resin, or a silicon optical waveguide on a substrate such as silicon, silica glass, or soda glass.

Further, the explanation in the following will be provided by taking as an example a multimode interferometer-type coupler for the coupler, but also a directional coupler can be used.

A fabrication process of the waveguide of the present invention will be briefly explained with reference to FIG. 6. Underclad glass fine particles 604 mainly made of $SiO_2$ and core glass fine particles 606 made of $SiO_2$ doped with $GeO_2$ are sequentially deposited on a silicon substrate 602 by a flame hydrolysis deposition method (FHD) (FIG. 6(1)). In this stage, the glass particles look white because of light scattering by the glass particles.

After that, the glass is made transparent at a high temperature above 1000° C. When the silicon substrate having the glass particles deposited on the surface thereof is heated gradually, the glass particles are melted and a transparent glass film is formed. At this time, the glass fine particles are deposited in such a manner that the thickness of the underclad glass layer 604 becomes 30 microns and the thickness of the core glass layer 606 becomes 7 microns (FIG. 6(2)).

Subsequently, the core glass layer 606 is patterned by a photolithography technique and reactive ion etching (RIE) (FIG. 6(3)).

Figure 6:
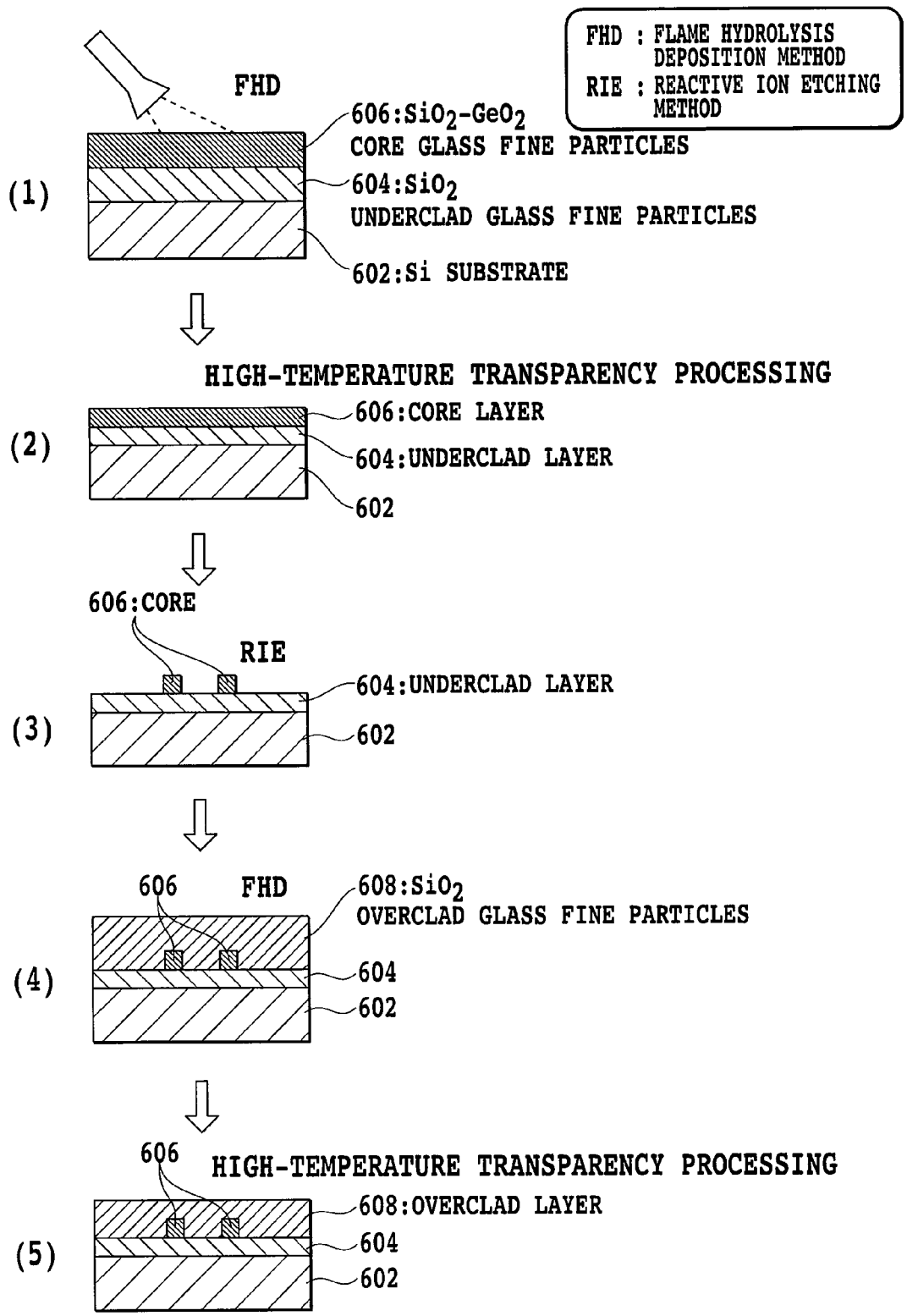
FIG. 6 is a diagram for explaining a waveguide fabrication process of an optical signal processing device in an embodiment of the present invention.

Overclad glass fine particles 608 are deposited over the core by the flame hydrolysis deposition method (FIG. 6(4). Last, the high-temperature transparency processing is carried out to fabricate an embedded waveguide (FIG. 6(5)). The glass transition temperature of the overclad glass layer 608 is reduced by the addition of boron trioxide and phosphorus pentoxide as dopant so as not to deform the core in the last high-temperature transparency processing.

Embodiment 1

Figure 7:
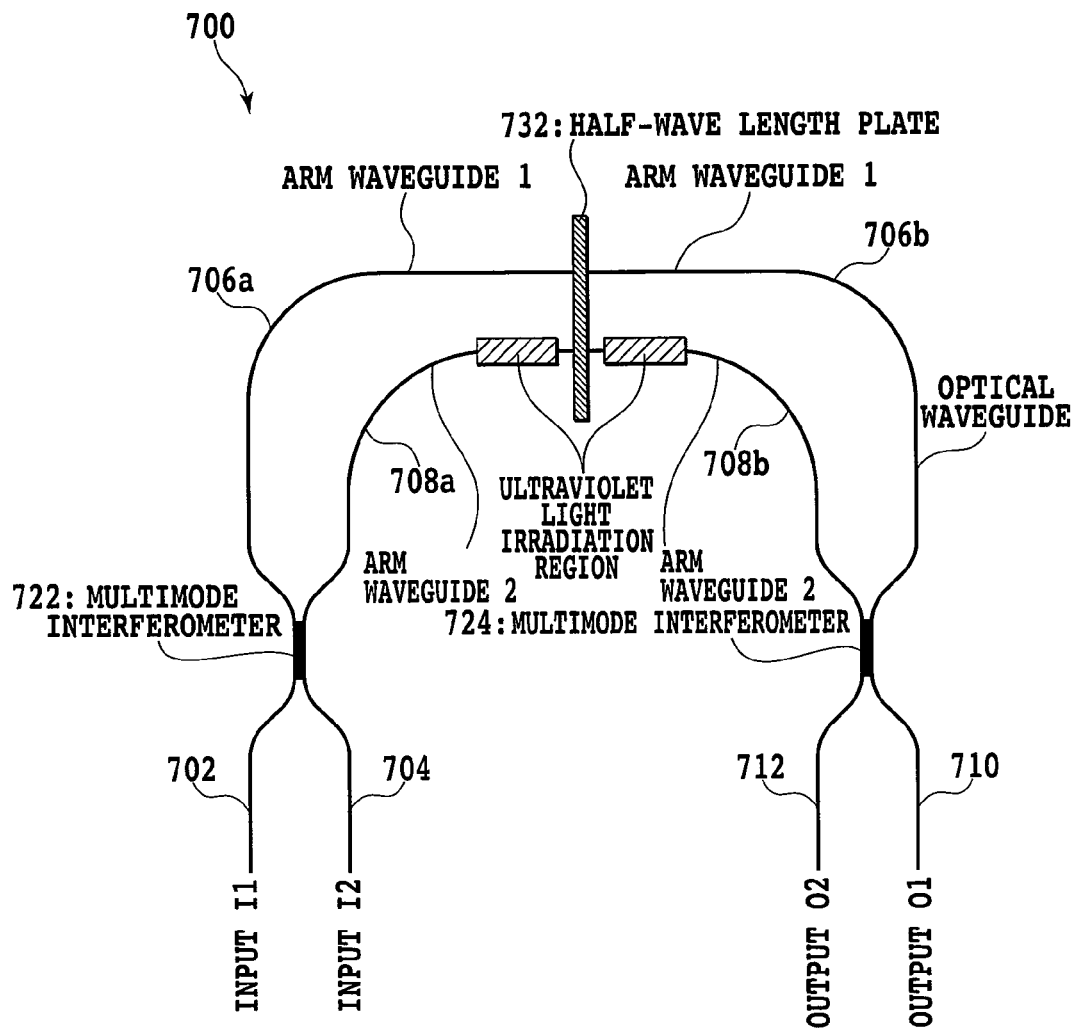
FIG. 7 is a schematic diagram of a Mach-Zehnder interferometer circuit fabricated as a first embodiment of the present invention.

FIG. 7 shows a schematic diagram of an MZI fabricated as a first embodiment of the present invention. The MZI 700 shown in FIG. 7 is provided with two multimode interferometer-type couplers (722, 724) and two arm waveguides (706, 708) connecting the two multimode interferometer-type couplers with each other. Further, the MZI 700 is provided with a half-wave length plate 732 inserted in a groove formed so as to divide the arm waveguide 706 at the center thereof into an arm waveguide 706a and a arm waveguide 706b for dividing the optical path length of the arm waveguide 706 into two, and so as to divide the arm waveguide 708 at the center thereof into an arm waveguide 708a and an arm waveguide 708b for dividing the optical path length of the arm waveguide 708 into two. The multimode interferometer-type coupler 722 is provided with two input waveguides (702, 704) and the multimode interferometer-type coupler 724 is provided with two output waveguides (710, 712).

The half-wave length plate 732 as a polarization rotation device is a polyimide wave length plate, and the optical principal axis thereof is perpendicular to a traveling direction and also is slanted at an angle of 45 degrees relative to the horizontal direction of the substrate plane (or vertical line of the substrate plane). The half-wave length plate 732 provides the polarized waves traveling along a slow axis and a fast axis thereof with a phase shift corresponding to a half wavelength of the design wavelength, respectively, and has the function of converting the TM polarization into the TE polarization and converting the TE polarization into the TM polarization.

In this MZI 700, the path difference (ΔL) between the two arm waveguides (706, 708) is set to be 20.7 mm for setting the FSR 10 GHz.

Further, in the MZI of the present embodiment, the birefringence is adjusted by irradiating a part of the arm waveguide around the half-wave length plate 732 with an ArF (argon fluoride) laser. Thus, the polarization dependence is suppressed by setting Δ(BL) zero in this MZI 700.

A method for setting Δ(BL) zero will be explained specifically in the following.

In the arm waveguide 1 (706), the waveguide length in the laser irradiation region is denoted by $L^{ir}_1$ and the waveguide length in the laser non-irradiation region is denoted by $L^{non}_1$. In the arm waveguide 2 (708), the waveguide length in the laser irradiation region is denoted by $L^{ir}_2$ and the waveguide length in the laser non-irradiation region is denoted by $L^{non}_2$. The birefringence in the laser irradiation region is denoted by $B^{ir}$ and the birefringence in the laser non-irradiation region is denoted by $B^{non}$. By the use of these symbols, Δ(BL) is expressed by Formula (45).

[Formula 43]

$$\Delta(BL)=(L_1^{ir}B^{ir}+L_1^{non}B^{non})-(L_2^{ir}B^{ir}+L_2^{non}B^{non}) \quad (45)$$

By the assumption of $L^{ir}_1=0$ for simplicity, Formula (46) is obtained.

[Formula 44]

$$\Delta(BL)=L_1^{non}B^{non}-(L_1^{ir}B^{ir}+L_2^{non}B^{non})=\Delta LB^{non}-L_2^{ir}\Delta B \quad (46)$$

Here, the path difference between the two arm waveguides is given in the following formula.

$$\Delta L=L_1^{non}-(L_2^{non}+L_2^{ir}) \quad \text{[Formula 45]}$$

Further, the birefringence difference is expressed by $\Delta B=B^{ir}-B^{non}$. The condition of setting Formula (46) zero is given by Formula (47).

[Formula 46]

$$L_2^{ir} = \frac{\Delta LB^{non}}{\Delta B} \quad (47)$$

Accordingly, $L^{ir}_2$ was set to be 10 mm so as to satisfy Formula (47) and the laser irradiation was carried out so as to make ΔB $2.1 \times 10^{-4}$. An ArF excimer laser having a wavelength of 193 nm was used for the laser source, and irradiation power, a pulse repetition rate, and irradiation time were set to be 1 J/cm², 50 Hz, and 530 sec, respectively. Further, the laser irradiation was carried out by the use of a metal mask only in the two laser irradiation regions being not covered by the metal mask and putting the half-wave length plate between thereof. An irradiation area was 50 μm×50 mm. Meanwhile, ΔL was 20.7 mm and $B^{non}$ was $1 \times 10^{-4}$, and Δ(BL) became nearly zero.

According to the present embodiment, the PDf was able to be suppressed down to 0.04 GHz for both of the cross path and the through-path around a wavelength of 1.55 μm. The PDf in the first conventional technique was 0.35 GHz for both of the cross path and the through-path. Accordingly, the PDf was able to be suppressed by the use of the present invention.

Further, when the environmental temperature was changed from −10° C. to 80° C., the variation of the PDf was 0.06 GHz for both of the cross path and the through-path. Meanwhile, in the MZI of the second conventional technique, this variation of the PDf was 6 GHz for both of the cross path and the through-path. Accordingly, the temperature dependence of the PDf was able to be reduced by the use of the present invention.

Note that the parts of the arm waveguides (706, 708) to be irradiated with the ArF laser may be apart from the half-wave length plate 732 and do not need to be symmetrical with respect to the half-wave length plate if the irradiation amounts are symmetrical.

The ArF excimer laser having a wavelength of 193 nm was used for adjusting the birefringence in the present embodiment. This is because the refractive index change of the core is caused by absorption related to $GeO_2$ at a wavelength of 245 nm and the efficient refractive index change or birefringence change become possible by the irradiation of a laser having an oscillation wavelength around 245 nm. Further, even visible laser can induce a similar change by two photon absorption. Accordingly, the laser is not limited to the ArF excimer laser and it is possible to use various kinds of excimer laser such as He—Cd laser, $N_2$ laser, KrF excimer laser, and $F_2$ excimer laser, and laser having a wavelength in an ultraviolet or visible range such as the second, third, and fourth harmonics of Ar ion laser, $Nd^{3+}$:YAG laser, and alexandrite ($Cr^{3+}$:$BeAl_2O_3$) laser.

Although the ArF laser was used as a birefringence adjustment method in the present embodiment, a similar effect can be obtained by the use of the following birefringence adjustment methods, for example.

(1) It is possible to use a method in which a stress-applying film is disposed over the waveguide to change stress induced in the waveguide for controlling the birefringence (refer to Non-patent document 4). That is, the stress-applying film (not shown in the drawing) is formed over the arm waveguide (706, 708) and the stress induced in the waveguide can be adjusted in such a manner that a difference between values in which birefringence values are integrated along the two arm waveguides in the travelling direction of the optical signal, respectively, becomes a desired value.

(2) It is possible to use a method in which a thin film heater above the waveguide is partially heated to control the effective refraction index or the birefringence permanently (refer to Patent document 2). That is, the thin film heater (not shown in the drawing) are formed above the waveguide (706, 708) and the stress induced in the waveguide can be adjusted by the control such that a difference between values in which birefringence values are integrated along the two arm waveguides in the travelling direction of the optical signal, respectively, become a desired value.

(3) It is possible to use a method in which a stress-releasing grooves are provided on both sides of the waveguide to release the stress applied to the waveguide and to control the effective refractive index or the birefringence (refer to Patent document 1). That is, the stress-releasing grooves (not shown in the drawing) are formed at a part of the arm waveguide on both sides in such a manner that a difference between values obtained by lineally integrating the birefringence for the two arm waveguides (706, 708) in the traveling direction of the optical signal, becomes a desired value, and the birefringence can be adjusted.

Embodiment 2

Figure 8:
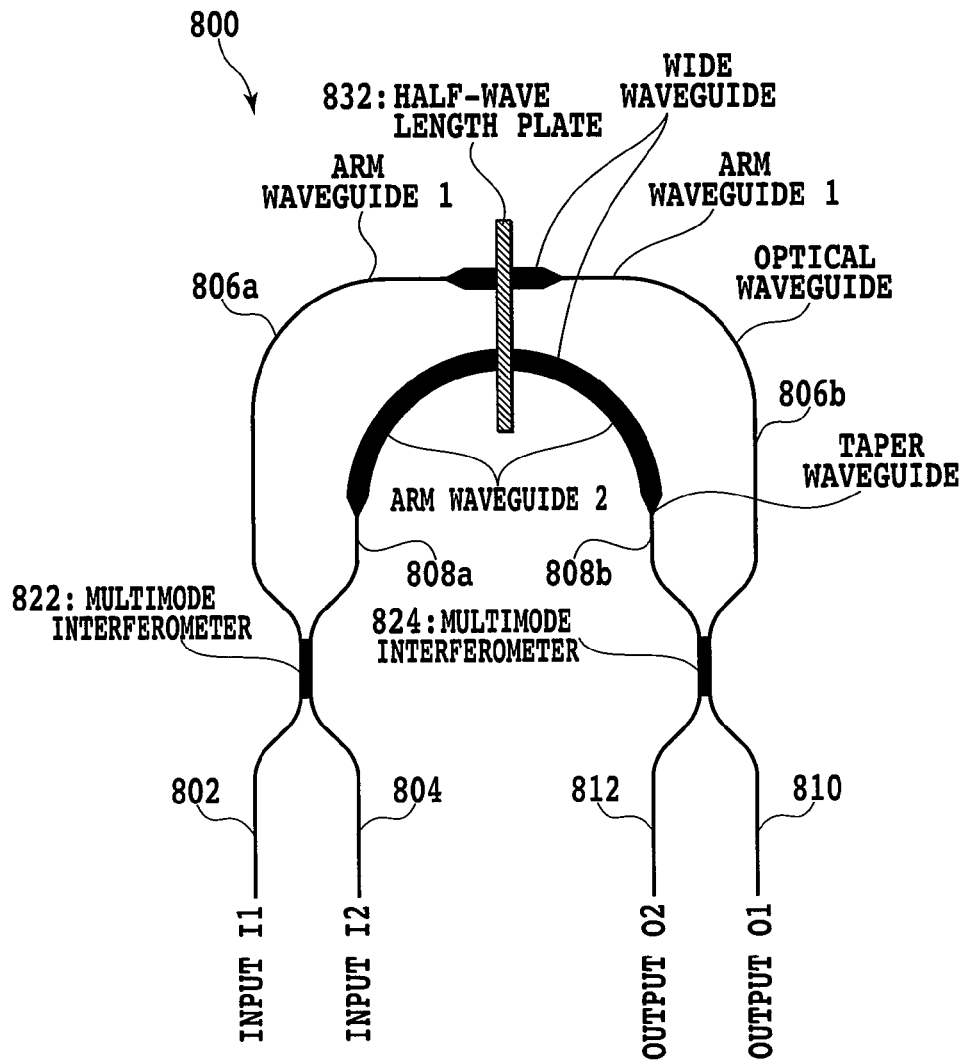
FIG. 8 is a schematic diagram of a Mach-Zehnder interferometer circuit fabricated as a second embodiment of the present invention.

FIG. 8 shows a schematic diagram of an MZI fabricated as a second embodiment of the present invention. The MZI 800 shown in FIG. 8 is provided with two multimode interferometer-type couplers (822, 824) and two arm waveguides (806, 808) connecting the two multimode interferometer-type couplers with each other. Further, the MZI 800 is provided with a half-wave length plate 832 inserted in a groove formed so as to divide the arm waveguide 806 at the center thereof into an arm waveguide 806a and a arm waveguide 806b for dividing the optical path length of the arm waveguide 806 into two, and so as to divide the arm waveguide 808 at the center thereof into an arm waveguide 808a and an arm waveguide 808b for dividing the optical path length of the arm waveguide 808 into two. The multimode interferometer-type coupler 822 is provided with two input waveguides (802, 804) and the multimode interferometer-type coupler 824 is provided with two output waveguides (810, 812).

The configuration, arrangement, and function of the half-wave length plate 832 as the polarization rotation device are the same as those of the half-wave length plate 732 in the first embodiment.

The MZI 800 of the present embodiment carries out the birefringence adjustment by changing the widths of the two arm waveguides (806, 808). It becomes possible to set the optical path length difference depending on the polarization $\Delta(BL)$ to be zero by the change of the waveguide widths (refer to Patent document 3).

The widths of the arm waveguides (806, 808) are set to be 7 μm near the multimode interferometer-type couplers (822, 824) and the arm waveguide widths are set to be 12 μm near the half-wave length plate 832.

In this MZI 800, the path difference ($\Delta L$) between the two arm waveguides (806, 808) is set to be 20.7 mm in the same way as that between the two arm waveguides (706, 708) in the first embodiment.

An effect of using the two waveguide widths will be explained specifically by the use of formulas. For the arm waveguide 1, the length of the wide waveguide is denoted by $L^w_1$ and the length of the narrow waveguide is denoted by $L^n_1$. For the arm waveguide 2, the length of the wide waveguide is denoted by $L^w_2$ and the length of the narrow waveguide is denoted by $L^n_2$. Further, the birefringence of the wide waveguide is denoted by $B^w$ and the birefringence of the narrow waveguide is denoted by $B^n$. By the use of these symbols, a difference between integrated birefringence values of the two arm waveguides in the travelling direction is given by Formula (48).

[Formula 47]

$$\Delta(BL) = (L^w_1 B^w + L^n_1 B^n) - (L^w_2 B^w + L^n_2 B^n) \tag{48}$$

By the assumption of $L^w_1 = 0$ for simplicity, Formula (49) is obtained.

[Formula 48]

$$\Delta(BL) = L^n_1 B^n - (L^w_2 B^w + L^n_2 B^n) = \Delta L B^n - L^w_2 \Delta B \tag{49}$$

Here, the length difference between the two arm waveguides is given by the following formula and a difference in the birefringence is given as $\Delta B = B^w - B^n$.

$$\Delta L = L^n_1 - (L^w_2 + L^n_2) \qquad \text{[Formula 49]}$$

The condition of making Formula (49) zero is given by Formula (50).

[Formula 50]

$$L^w_2 = \frac{\Delta L B^n}{\Delta B} \tag{50}$$

$L^w_2$ was determined in consideration of satisfying the above formula. Specific values were set as follows; $B^w=1.57\times10^{-4}$, $B''=0.8\times10^{-4}$, $L^w_1=0.5$ mm, and $L^w_2=26.2$ mm.

Here, the wide waveguide is not necessary for the arm waveguide 1 only for making $\Delta(BL)$ zero, but the wide waveguide is preferably disposed also for the arm waveguide 1 from the following reasons.

A loss difference in the case of the presence or absence of the taper waveguide is eliminated between the arm waveguides.

A diffraction loss of radiation in a half-wave length plate without a confining structure is suppressed when the width of the waveguide divided by the half-wave length plate is made wider.

According to the present embodiment, the PDf was able to be suppressed down to 0.05 GHz at a wavelength around 1.55 µm for both of the cross path and the through-path.

Further, when the environmental temperature was changed from −10° C. to 80° C., the PDf variation was able to be suppressed down to 0.06 GHz for both of the cross path and the through-path.

Embodiment 3

Figure 9:
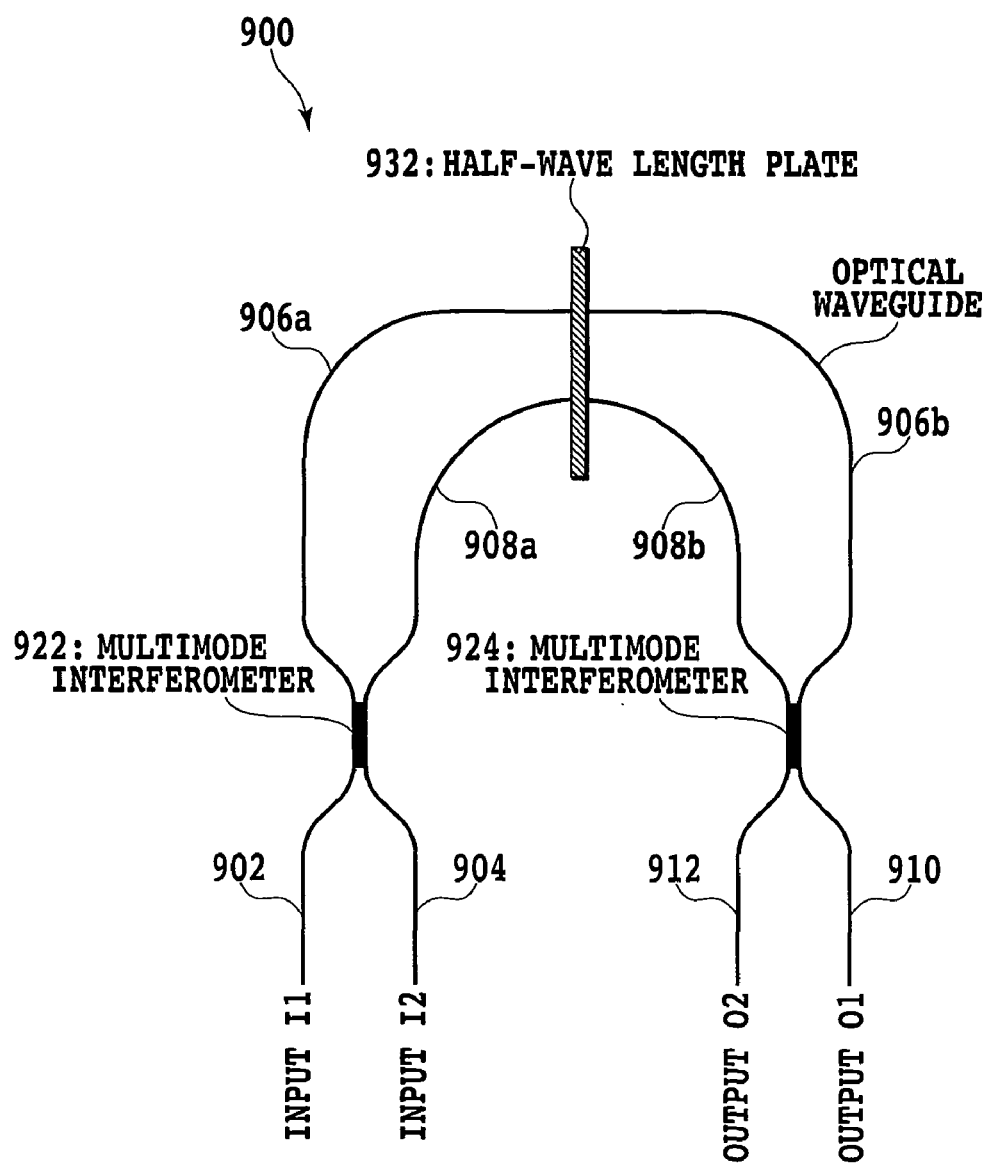
FIG. 9 is a schematic diagram of a Mach-Zehnder interferometer circuit fabricated as a third embodiment of the present invention.

FIG. 9 shows a schematic diagram of an MZI fabricated as a third embodiment of the present invention. The MZI 900 shown in FIG. 9 is provided with two multimode interferometer-type couplers (922, 924) and two arm waveguides (906, 908) connecting the two multimode interferometer-type couplers with each other. Further, the MZI 900 is provided with a half-wave length plate 932 inserted in a groove formed so as to divide the arm waveguide 906 at the center thereof into an arm waveguide 906a and an arm waveguide 906b for dividing the optical path length of the arm waveguide 906 into two, and so as to divide the arm waveguide 908 at the center thereof into an arm waveguide 908a and an arm waveguide 908b for dividing the optical path length of the arm waveguide 908 into two. The multimode interferometer-type coupler 922 is provided with two input waveguides (902, 904) and the multimode interferometer-type coupler 924 is provided with two output waveguides (910, 912).

The configuration, arrangement, and function of the half-wave length plate 932 as the polarization rotation device are the same as those of the half-wave length plate 732 in the first embodiment.

In this MZI 900, a path difference ($\Delta L$) between the two arm waveguides (906, 908) is set to be 20.7 mm the same as that between the two arm waveguides (706, 708) in the first embodiment.

A feature of this configuration is that the birefringence value is set to be $1.5\times10^{-4}$. Here, the birefringence was adjusted by the change of the thermal expansion coefficient and the softening temperature in the overclad glass. That is, the overclad glass was doped with boron trioxide at a rate of 10 mol % and phosphorus pentoxide at a rate of 10 mol % relative to silica. As a result, the optical path difference depending on the polarization $\Delta(BL)$ becomes $3.1\times10^{-4}$ from the following formula.

[Formula 51]

$$\Delta(BL)=\int Bdl_1-\int Bdl_2=1.5\times10^{-4}\times20.7\times10^{-3}=3.1\times10^{-6} \qquad (51)$$

This optical path length difference depending on the polarization $\Delta(BL)$ has an order number of 2 when the wavelength to be used is 1.55 µm and nearly satisfies Formula (16) and also Formula (26).

According to the present embodiment, the PDf was able to be suppressed down to 0.006 GHz at a wavelength around 1.55 µm for both of the cross path and the through-path.

Further, when the environmental temperature was changed from −10° C. to 80° C., the PDf variation was able to be suppressed down to 0.06 GHz for both of the cross path and the through-path.

Embodiment 4

Figure 10:
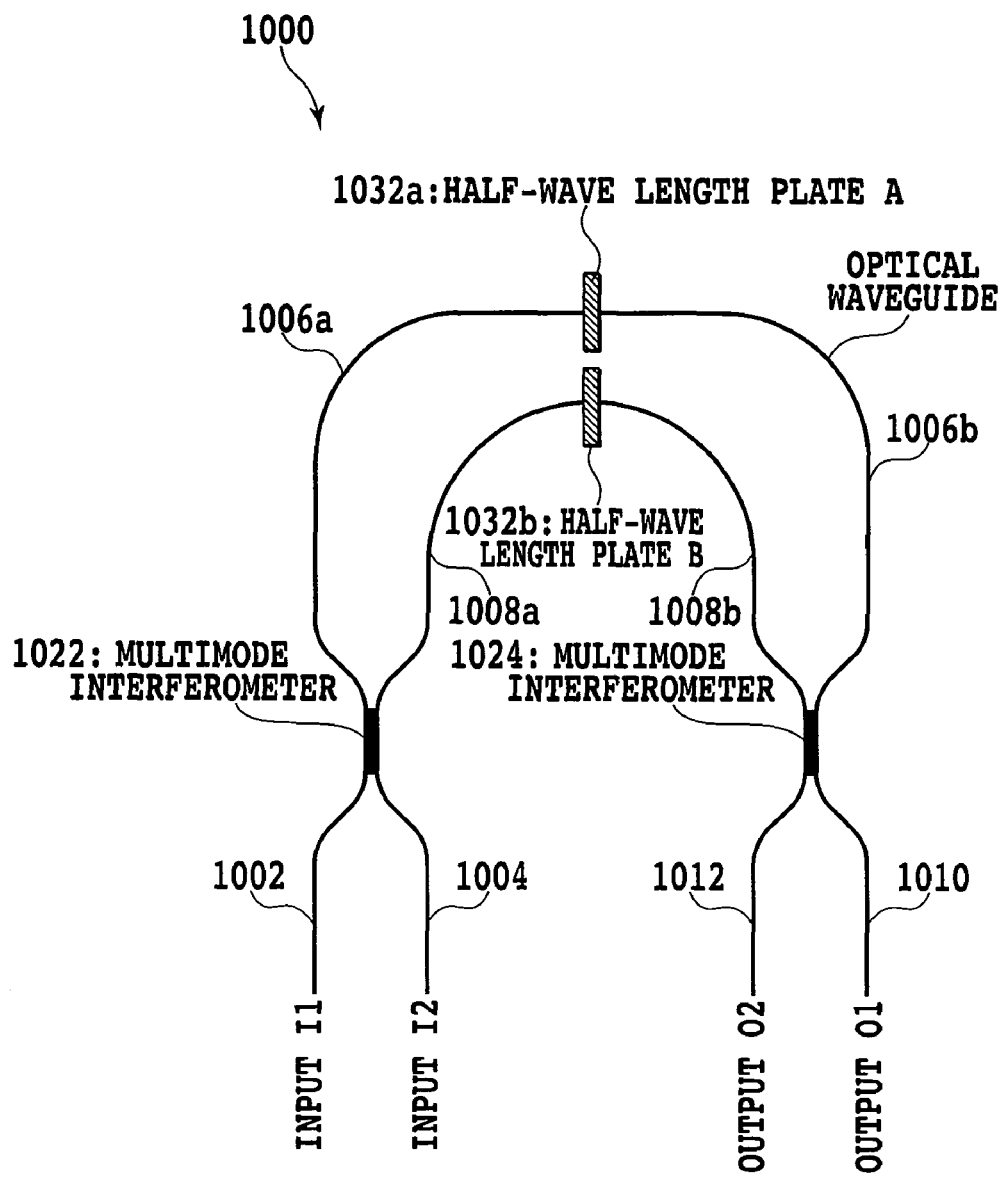
FIG. 10 is a schematic diagram of a Mach-Zehnder interferometer circuit fabricated as a fourth embodiment of the present invention.

FIGS. 10 and 11 show schematic diagrams of an MZI fabricated as a fourth embodiment of the present invention. The MZI 1000 is provided with two multimode interferometer-type couplers (1022, 1024) and two arm waveguides (1006, 1008) connecting the two multimode interferometer-type couplers with each other, each fabricated on a silicon substrate 1102. Further, the MZI 1000 is provided with a half-wave length plate 1032 inserted in a groove 1120 formed so as to divide the arm waveguide 1006 at the center thereof into an arm waveguide 1006a and a arm waveguide 1006b for dividing the optical path length of the arm waveguide 1006 into two, and so as to divide the arm waveguide 1008 at the center thereof into an arm waveguide 1008a and an arm waveguide 1008b for dividing the optical path length of the arm waveguide 1008 into two. The multimode interferometer-type coupler 1022 is provided with two input waveguides (1002, 1004) and the multimode interferometer-type coupler 1024 is provided with two output waveguides (1010, 1012).

Figure 11A:
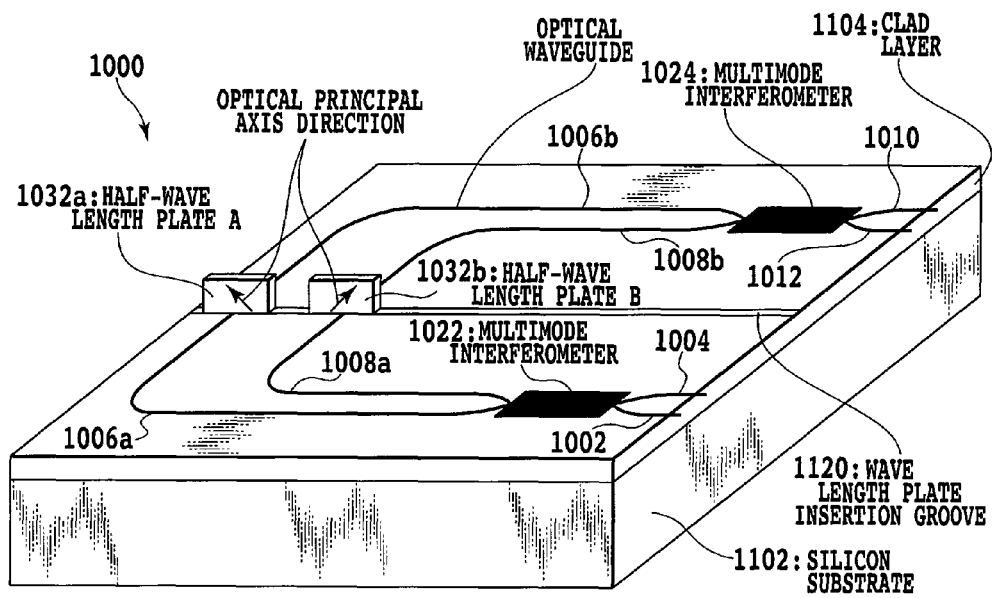
FIG. 11A is a schematic diagram of a Mach-Zehnder interferometer circuit fabricated as a fourth embodiment of the present invention.
Figures 11B, 11C:
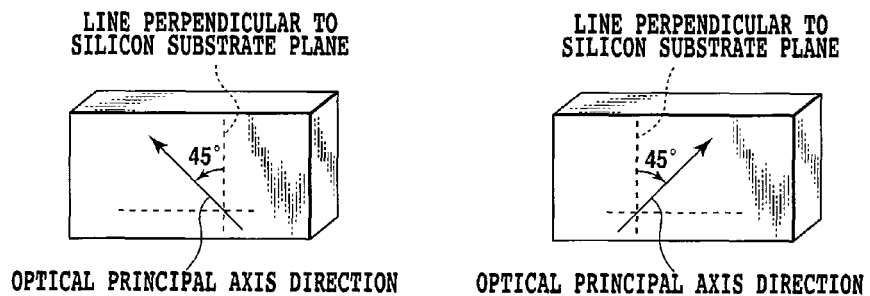
FIG. 11B is a diagram for explaining a configuration of the half-wave length plate in FIG. 11A.
FIG. 11C is a diagram for explaining a configuration of the other half-wave length plate in FIG. 11A.

As shown in FIG. 11A, the half-wave length plate 1032 as the polarization rotation device includes a half-wave length plate 1032a and a half-wave length plate 1032b. Each of the half-wave length plate 1032a and the half-wave length plate 1032b, as shown in FIGS. 11B and 11C, respectively, has an optical principal axis which is perpendicular to the travelling direction and also is slanted at an angle of 45 degrees relative to the horizontal direction (or vertical direction) of the substrate, and the principal axis direction of the half-wave length plate 1032a and the principal axis direction of the half-wave length plate 1032b are perpendicular to each other.

Each of the half-wave length plate 1032a and the half-wave length plate 1032b provides the polarized waves traveling along a slow axis and a fast axis thereof, respectively with a phase shift corresponding to a half wavelength of the design wavelength. The half-wave length plate 1032 has the function of converting the TM polarization into the TE polarization and converting the TE polarization into the TM polarization.

In the present embodiment, the overclad glass was doped with boron trioxide at a rate of 20 mol % and phosphorus pentoxide at a rate of 5 mol % relative to silica, and the birefringence value was set to be $0.775\times10^{-4}$. As a result, the optical path difference depending on the polarization becomes $1.55\times10^{-6}$ from Formula (52).

[Formula 52]

$$\int Bdl_1-Bdl_2=\Delta(BL)=0.775\times10^{-4}\times20.7\times10^{-3}=1.55\times10^{-6} \qquad (52)$$

This optical path length difference depending on the polarization $\Delta(BL)$ has an order number of 1 when the wavelength to be used is 1.55 µm and can nearly satisfies Formula (35) and also Formula (44).

According to the present embodiment, the PDf was able to be suppressed down to 0.07 GHz at a wavelength around 1.55 µm for both of the cross path and the through-path.

Further, when the environmental temperature was changed from −10° C. to 80° C., the PDf variation was able to be suppressed down to 0.06 GHz for both of the cross path and the through-path.

It is needless to say that the birefringence value can be adjusted by the application of the above first to third embodiments to the present embodiment.

Further, the above embodiments used the MZI having a FSR of 10 GHz. It is obvious that the same effect can be expected even for another FSR value such as 20 GHz or 40 GHz in addition to the above FSR value.

The invention claimed is:

1. An optical signal processing device comprising a Mach-Zehnder interferometer circuit, the Mach-Zehnder interferometer circuit comprising two couplers and two arm waveguides, each fabricated on a substrate, the two arm waveguides connecting the two couplers with each other, the Mach-Zehnder interferometer circuit comprising:
   a polarization rotation device disposed in a groove dividing each of the two arm waveguides into two, the polarization rotation device for converting horizontally polarized light into vertically polarized light and converting vertically polarized light into horizontally polarized light,
   wherein a difference between birefringence values divided by an optical wavelength to be used is within a range of 2 m−0.2 to 2 m+0.2 (m is an integer including zero), the birefringence values being curvilinear integrals of the birefringence along the respective two arm waveguides in an optical signal travelling direction.

2. The optical signal processing device according to claim 1, wherein the polarization rotation device is a half-wave length plate disposed in such a manner that an optical principal axis thereof is slanted at an angle of 45 degrees relative to a vertical line of the substrate plane and is also perpendicular to the optical signal travelling direction.

3. The optical signal processing device according to claim 1, wherein the coupler is a directional coupler or a multimode interference-type coupler.

4. The optical signal processing device according to claim 1, wherein at least one of the two arm waveguides has a width changing partially, thereby the birefringence is adjusted such that the difference between the birefringence values becomes a desired value, the birefringence values being curvilinear integrals of the birefringence along the respective two arm waveguides in the optical signal travelling direction.

5. The optical signal processing device according to claim 1, wherein at least one of the two arm waveguides is partially irradiated with laser, thereby the birefringence is adjusted such that the difference between the birefringence values becomes a desired value, the birefringence values being curvilinear integrals of the birefringence along the respective two arm waveguides in the optical signal travelling direction.

6. The optical signal processing device according to claim 1, wherein at least one of the two arm waveguides has stress-releasing grooves formed partially at both sides thereof, thereby the birefringence is adjusted such that the difference between the birefringence values becomes a desired value, the birefringence values being curvilinear integrals of the birefringence along the respective two arm waveguides in the optical signal travelling direction.

7. The optical signal processing device according to claim 1, wherein at least one of the two arm waveguides has a stress-applying film formed over an upper surface thereof, thereby the birefringence is adjusted such that the difference between the birefringence values becomes a desired value, the birefringence values being curvilinear integrals along the respective two arm waveguides in the optical signal travelling direction.

8. The optical signal processing device according to claim 1, wherein at least one of the two arm waveguides has a thin film heater formed thereover for changing stress, thereby the birefringence is adjusted such that the difference between the birefringence values becomes a desired value, the birefringence values being curvilinear integrals of the birefringence along the respective two arm waveguides in the optical signal travelling direction.

9. An optical signal processing device comprising a Mach-Zehnder interferometer circuit, the Mach-Zehnder interferometer circuit comprising two couplers and two arm waveguides, each fabricated on a substrate, the two arm waveguides connecting the two couplers with each other, the Mach-Zehnder interferometer circuit comprising:
   two polarization rotation devices each disposed in a groove dividing each of the two arm waveguides into two, the polarization rotation device for converting horizontally polarized light into vertically polarized light and converting vertically polarized light into horizontally polarized light, and
   wherein a difference between birefringence values divided by an optical wavelength to be used is within a range of (2 m−1)−0.2 to (2 m−1)+0.2 (m is an integer including zero), the birefringence values being curvilinear integrals of the birefringence along the respective two arm waveguides in an optical signal travelling direction.

10. The optical signal processing device according to claim 9, wherein the two polarization rotation devices are half-wave length plates disposed in such a manner that each of optical principal axes thereof is slanted at an angle of 45 degrees relative to a vertical line of the substrate plane and is also perpendicular to the optical signal travelling direction, in which the optical principal axis in one of the polarization rotation devices and the optical principal axis in the other one of the polarization rotation devices are perpendicular to each other.

11. The optical signal processing device according to claim 9, wherein the coupler is a directional coupler or a multimode interference-type coupler.

12. The optical signal processing device according to claim 9, wherein at least one of the two arm waveguides has a width changing partially, thereby the birefringence is adjusted such that the difference between the birefringence values becomes a desired value, the birefringence values being curvilinear integrals of the birefringence along the respective two arm waveguides in the optical signal travelling direction.

13. The optical signal processing device according to claim 9, wherein at least one of the two arm waveguides is partially irradiated with laser, thereby the birefringence is adjusted such that the difference between the birefringence values becomes a desired value, the birefringence values being curvilinear integrals of the birefringence along the respective two arm waveguides in the optical signal travelling direction.

14. The optical signal processing device according to claim 9, wherein at least one of the two arm waveguides has stress-releasing grooves formed partially at both sides thereof, thereby the birefringence is adjusted such that the difference between the birefringence values becomes a desired value, the birefringence values being curvilinear integrals of the birefringence along the respective two arm waveguides in the optical signal travelling direction.

15. The optical signal processing device according to claim 9, wherein at least one of the two arm waveguides has a stress-applying film formed over an upper surface thereof, thereby the birefringence is adjusted such that the difference between the birefringence values becomes a desired value, the birefringence values being curvilinear integrals along the respective two arm waveguides in the optical signal travelling direction.

16. The optical signal processing device according to claim 9, wherein at least one of the two arm waveguides has a thin film heater formed thereover for changing stress, thereby the birefringence is adjusted such that the difference between the birefringence values becomes a desired value, the birefringence values being curvilinear integrals of the birefringence along the respective two arm waveguides in the optical signal travelling direction.

* * * * *